(12) United States Patent
Park et al.

(10) Patent No.: US 11,044,723 B2
(45) Date of Patent: Jun. 22, 2021

(54) ELECTRONIC DEVICE AND COMMUNICATION METHOD FOR ELECTRONIC DEVICE

(71) Applicant: Samsung Electronics Co., Ltd., Gyeonggi-do (KR)

(72) Inventors: Sung Jin Park, Seoul (KR); Dae Ho Kang, Gyeonggi-do (KR); Chang Won Nam, Seoul (KR); Hyung Yeol Lee, Seoul (KR); Chaiman Lim, Seoul (KR); Won Joon Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/344,068

(22) PCT Filed: Oct. 25, 2017

(86) PCT No.: PCT/KR2017/011863
§ 371 (c)(1),
(2) Date: Apr. 23, 2019

(87) PCT Pub. No.: WO2018/080171
PCT Pub. Date: May 3, 2018

(65) Prior Publication Data
US 2019/0261363 A1 Aug. 22, 2019

(30) Foreign Application Priority Data
Oct. 25, 2016 (KR) .................. 10-2016-0139021

(51) Int. Cl.
*H04W 72/04* (2009.01)
*H04L 5/00* (2006.01)
(Continued)

(52) U.S. Cl.
CPC .......... *H04W 72/0446* (2013.01); *H04B 1/00* (2013.01); *H04L 5/0048* (2013.01);
(Continued)

(58) Field of Classification Search
None
See application file for complete search history.

(56) References Cited

U.S. PATENT DOCUMENTS 8,537,798 B2 9/2013 Tsfati et al.
8,874,124 B2 10/2014 Clegg
(Continued)

FOREIGN PATENT DOCUMENTS

| KR | 10-1503200 B1 | 3/2015 |
| KR | 10-2016-0101440 A | 8/2016 |
| WO | 2016/039559 A1 | 3/2016 |

*Primary Examiner* — Diane L Lo
(74) *Attorney, Agent, or Firm* — Cha & Reiter, LLC

(57) ABSTRACT

An electronic device according to an embodiment may comprise: at least one antenna; a first communication circuit connected to the at least one antenna and configured to communicate using a long term evolution (LTE) signal in a licensed band and an LTE signal in an unlicensed band; and a second communication circuit connected to the first communication circuit and at least a part of the at least one antenna, and configured to communicate using a Wi-Fi signal in the unlicensed band. The first communication circuit is configured to, acquire, from the second communication circuit, information on state of a channel in the unlicensed band associated with the first communication circuit and the second communication circuit, and determine a time interval associated with processing of the LTE signal in the unlicensed band. Various other embodiments recognized from the specification are also possible.

18 Claims, 14 Drawing Sheets

(51) Int. Cl.

| | |
|---|---|
| *H04W 16/14* | (2009.01) |
| *H04W 52/02* | (2009.01) |
| *H04B 1/00* | (2006.01) |
| *H04W 74/08* | (2009.01) |
| *H04W 24/02* | (2009.01) |
| *H04W 84/12* | (2009.01) |
| *H04W 88/06* | (2009.01) |

(52) U.S. Cl.
 CPC ........... *H04W 16/14* (2013.01); *H04W 24/02* (2013.01); *H04W 52/02* (2013.01); *H04W 74/0808* (2013.01); *H04W 88/06* (2013.01); *H04W 74/0816* (2013.01); *H04W 84/12* (2013.01); *Y02D 30/70* (2020.08)

(56) References Cited

U.S. PATENT DOCUMENTS

| | | |
|---|---|---|
| 9,100,108 B2 | 8/2015 | Prajapati et al. |
| 9,591,633 B2 | 3/2017 | Clegg |
| 9,794,794 B2 | 10/2017 | Clegg |
| 2013/0155931 A1 | 6/2013 | Prajapati et al. |
| 2013/0337821 A1 | 12/2013 | Clegg |
| 2014/0177500 A1* | 6/2014 | Han ................ H04W 52/36 370/311 |
| 2015/0009869 A1 | 1/2015 | Clegg |
| 2015/0009962 A1 | 1/2015 | Clegg |
| 2015/0043440 A1 | 2/2015 | Ko et al. |
| 2015/0215471 A1 | 7/2015 | Ljung |
| 2015/0373559 A1* | 12/2015 | Hong ............... H04W 52/0206 370/329 |
| 2015/0373674 A1 | 12/2015 | Han et al. |
| 2016/0073366 A1 | 3/2016 | Ng et al. |
| 2016/0227571 A1 | 8/2016 | Baek et al. |
| 2016/0242183 A1 | 8/2016 | Kang et al. |
| 2016/0366000 A1* | 12/2016 | Pelletier .............. H04L 5/0053 |
| 2017/0094529 A1 | 3/2017 | Clegg |
| 2017/0142752 A1* | 5/2017 | Schmidt ............ H04L 25/03159 |
| 2017/0208588 A1* | 7/2017 | Park ................... H04L 1/1887 |
| 2017/0257777 A1 | 9/2017 | Clegg |
| 2017/0265084 A1 | 9/2017 | Clegg |
| 2017/0272955 A1* | 9/2017 | Sadek ................ H04W 16/14 |
| 2017/0303220 A1* | 10/2017 | Sadeghi ............. H04W 72/042 |
| 2017/0311322 A1* | 10/2017 | Kim ................... H04L 1/1887 |
| 2018/0092109 A1* | 3/2018 | Belghoul ........... H04B 7/0632 |

* cited by examiner

ELECTRONIC DEVICE AND COMMUNICATION METHOD FOR ELECTRONIC DEVICE

This application is a National Phase Entry of PCT International Application No. PCT/KR2017/011863, which was filed on Oct. 25, 2017, and claims a priority to Korean Patent Application No. 10-2016-0139021, which was filed on Oct. 25, 2016, the contents of which are incorporated herein by reference.

TECHNICAL FIELD

The disclosure relates to technologies of performing communication in an unlicensed band.

BACKGROUND ART

An electronic device, such as a smartphone, supports a cellular network, such as 3G or long term evolution (LTE). In recent years, there has been a growing interest in a communication protocol which uses a signal in an unlicensed band to enhance communication performance without the cost of purchasing a frequency.

For example, research has been conducted in licensed-assisted access using LTE (LAA), LTE-unlicensed (LTE-U), and the like, which aggregate an LTE signal in a licensed band which is a primary carrier and an LTE signal in an unlicensed band which is a secondary carrier.

DISCLOSURE

Technical Problem

When communication is performed according to a communication protocol such as LAA or LTE-U, an electronic device may decode a subframe associated with a small cell which transmits a signal in an unlicensed band to the electronic device. Because the electronic device is unable to know when data will be transmitted although the data is not transmitted from the small cell, it may decode all subframes. When decoding all the subframes, the electronic device may unnecessarily consume power. To reduce the above-mentioned power consumption, the electronic device may perform cell-specific reference signal (CRS) blind detection. However, because the CRS blind detection is a manner of decoding a first orthogonal frequency division multiplexing symbol (OFDM) included in each subframe, the electronic device may still consume unnecessary power. Furthermore, when receiving an uplink grant, the electronic device may perform clear channel assessment (CCA) for all subframes assigned for uplink transmission. In this case, the electronic device may also consume unnecessary power.

Various embodiments disclosed in the disclosure are to provide an electronic device for reducing power consumed to process a communication signal in an unlicensed band and a method therefor to address the above-mentioned problems and issues raised in the disclosure.

Technical Solution

In accordance with an aspect of the disclosure, an electronic device is provided. The electronic device may include one or more antennas, a first communication circuitry configured to be electrically connected with at least a part of the one or more antennas and perform communication according to a first communication protocol which uses a long term evolution (LTE) signal in a licensed band and an LTE signal in an unlicensed band, and a second communication circuitry configured to be electrically connected with at least a part of the one or more antennas and the first communication circuitry and perform communication according to a second communication protocol which uses a Wi-Fi signal in the unlicensed band. The first communication circuitry may be configured to obtain information about a state of a channel in the unlicensed band associated with the first communication circuitry and the second communication circuitry from the second communication circuitry and determine a time interval associated with processing the LTE signal in the unlicensed band based on the information about the state of the channel.

In accordance with another aspect of the disclosure, a method is provided. The method may include obtaining information about a state of a channel in the unlicensed band associated with the first communication protocol and the second communication protocol, determining a time interval associated with processing the LTE signal in the unlicensed band based on the information about the state of the channel, and stopping processing the LTE signal in the unlicensed band during the time interval.

Advantageous Effects

According to embodiments disclosed in the disclosure, power consumed for communication may be reduced by stopping an operation of decoding an LTE signal in an unlicensed band or an operation of determining whether the LTE signal is transmitted, based on a state of a channel associated with the LTE signal and a Wi-Fi signal in the unlicensed band.

Furthermore, power consumed for communication may be reduced by deactivating hardware for processing an LTE signal in an unlicensed band based on a state of a channel associated with the LTE signal and a Wi-Fi signal in the unlicensed band.

Furthermore, power consumed for communication may be reduced by selecting some of a plurality of subframes assigned to an electronic device based on a state of a channel associated with an LIE signal and a Wi-Fi signal in an unlicensed band.

In addition, various effects directly or indirectly ascertained through the disclosure may be provided.

MODE FOR INVENTION

Figure 1:
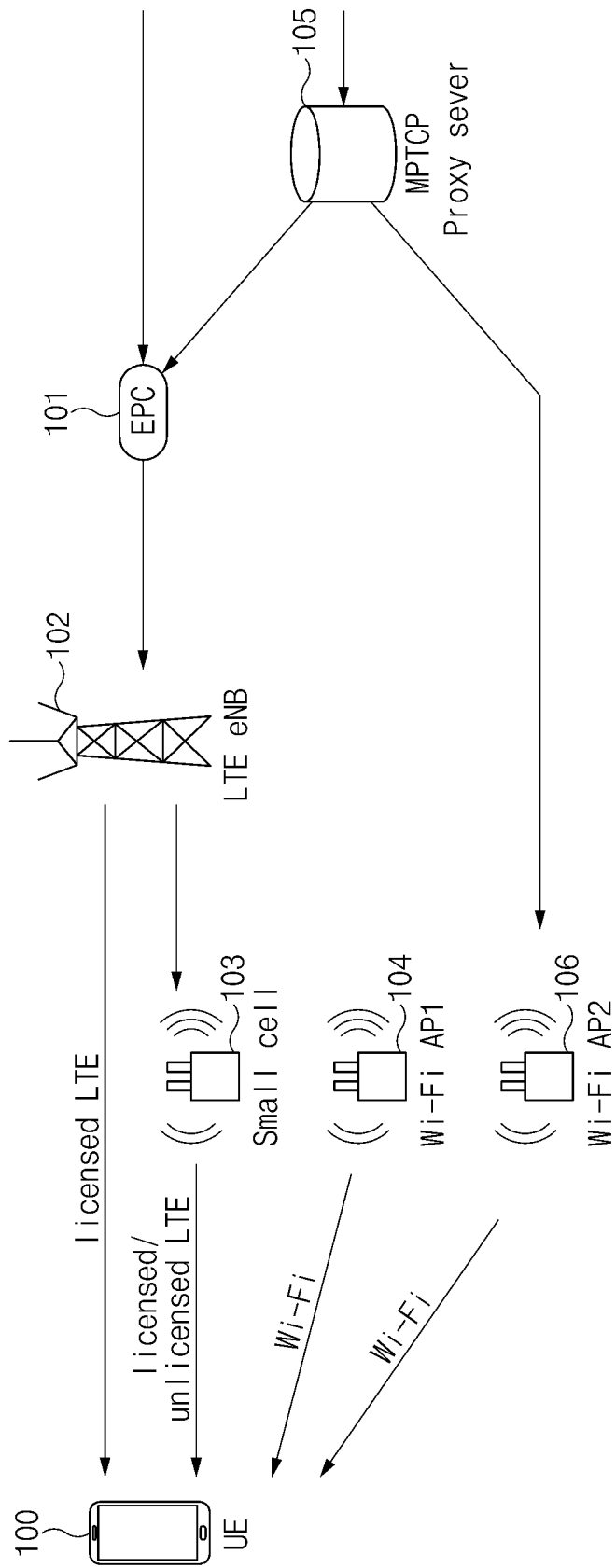
FIG. 1 illustrates an environment in which an electronic device is operated, according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various components regardless of the order and/or the priority and to distinguish the relevant components from other components, but do not limit the components. When an component (e.g., a first component) is referred to as being "(operatively or communicatively) coupled with/to" or "connected to" another component (e.g., a second component), the component may be directly coupled with/to or connected to the other component or an intervening component (e.g., a third component) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 illustrates an environment in which an electronic device is operated, according to an embodiment.

Referring to FIG. 1, an electronic device 100 according to an embodiment may be a mobile device used by a user. The electronic device 100 may be referred to as a mobile device, a mobile terminal, user equipment (UE), or the like.

The electronic device 100 according to an embodiment may communicate with an external device (e.g., a base station 102, a small cell 103, a first Wi-Fi access point (AP) 104, or a second Wi-Fi access point 106) in a licensed band and an unlicensed band. The electronic device 100 may communicate using one or more communication protocols among, for example, long term evolution (LTE), licensed-assisted access using LTE (LAA), LTE-unlicensed (LTE-U), or Wi-Fi. The electronic device 100 may support various communication protocols (e.g., LTE-WiFi aggregation (LWA), LTE WLAN integration with internet protocol security tunnel (LWIP), multipath TCP (MPTCP), smart bonding, or the like) which simultaneously use the licensed band the unlicensed band other than the above-mentioned communication protocols. The electronic device 100 may perform communication according to a communication protocol, such as LAA or LTE-U, by anchoring to an LTE channel which uses the licensed band and adding a channel which uses the unlicensed band. The electronic device 100 may perform Wi-Fi which uses the unlicensed band.

According to an embodiment, the electronic device 100 may communicate with a base station 102 (or an evolved node B (eNB)) connected with an evolved packet core (EPC) 101 which is a core network. The electronic device 100 may perform communication in an LTE mode through the base station 102. In this case, the electronic device 100 may perform communication with the base station 102 in the licensed band.

According to an embodiment, the electronic device 100 may communicate with the small cell 103 connected with the base station 102. The electronic device 100 may perform communication in an LAA or LTE-U mode through the small cell 103. For example, the electronic device 100 may receive a signal of the licensed band (e.g., 1.8 GHz) from the base station 102 and may receive a signal of the licensed band (e.g., 1.8 GHz) and/or the unlicensed band (e.g., 5 GHz). Herein, the signal of the licensed band and the unlicensed band may be a signal according to the LTE specification. The electronic device 100 may perform communication in the LAA or LTE-U mode by being anchored to a primary cell (PCell) of the licensed band and adding a secondary cell (Scell) of the unlicensed band.

According to an embodiment, the electronic device 100 may communicate with the first Wi-Fi access point 104. The electronic device 100 may perform communication in a Wi-Fi mode through the first Wi-Fi access point 104. The electronic device 100 may aggregate the licensed band used in LTE communication with the base station 102 and the unlicensed band used in Wi-Fi communication with the first Wi-Fi access point 104.

According to an embodiment, the electronic device 100 may perform communication in an LWA through the base station 102 and the first Wi-Fi access point 104. For example, the electronic device 100 may aggregate the licensed band used in LTE communication with the base station 102 and the unlicensed band used in Wi-Fi communication with the first Wi-Fi access point 104 in a random access network (RAN) level.

According to an embodiment, the electronic device 100 may perform communication in smart bonding through the base station 102 and the first Wi-Fi access point 104. For example, the electronic device 100 may aggregate the licensed band used in LTE communication with the base station 102 and the unlicensed band used in Wi-Fi communication with the first Wi-Fi access point 104 in an application level.

According to an embodiment, the electronic device 100 may perform communication in LWIP. For example, the electronic device 100 may aggregate the licensed band used in LTE communication with the base station 102 and the unlicensed band used in Wi-Fi communication with the first Wi-Fi access point 104 in an internet protocol level.

According to an embodiment, the electronic device 100 may communicate with the second Wi-Fi access point 106. The electronic device 100 may perform communication in the Wi-Fi mode through the second Wi-Fi access point 106. The electronic device 100 may aggregate the licensed band used in LTE communication with the base station 102 and the unlicensed band used in Wi-Fi communication with the first Wi-Fi access point 104 in a TCP level. In this case, the electronic device 100 may perform communication in an MPTCP mode through the base station 102 and the second Wi-Fi access point 106. The second Wi-Fi access point 106 may be connected with an MPTCP proxy server 105.

As described above, the electronic device 100 may communicate in various modes, such as LAA, LTE-U, and/or Wi-Fi, which use the unlicensed band. The electronic device 100 according to an embodiment may omit to process a signal in the unlicensed band to save power consumed for communication or may deactivate hardware for processing a signal in the unlicensed band. A description will be given in detail below of an operation of the electronic device 100 for saving power consumption.

Figure 2:
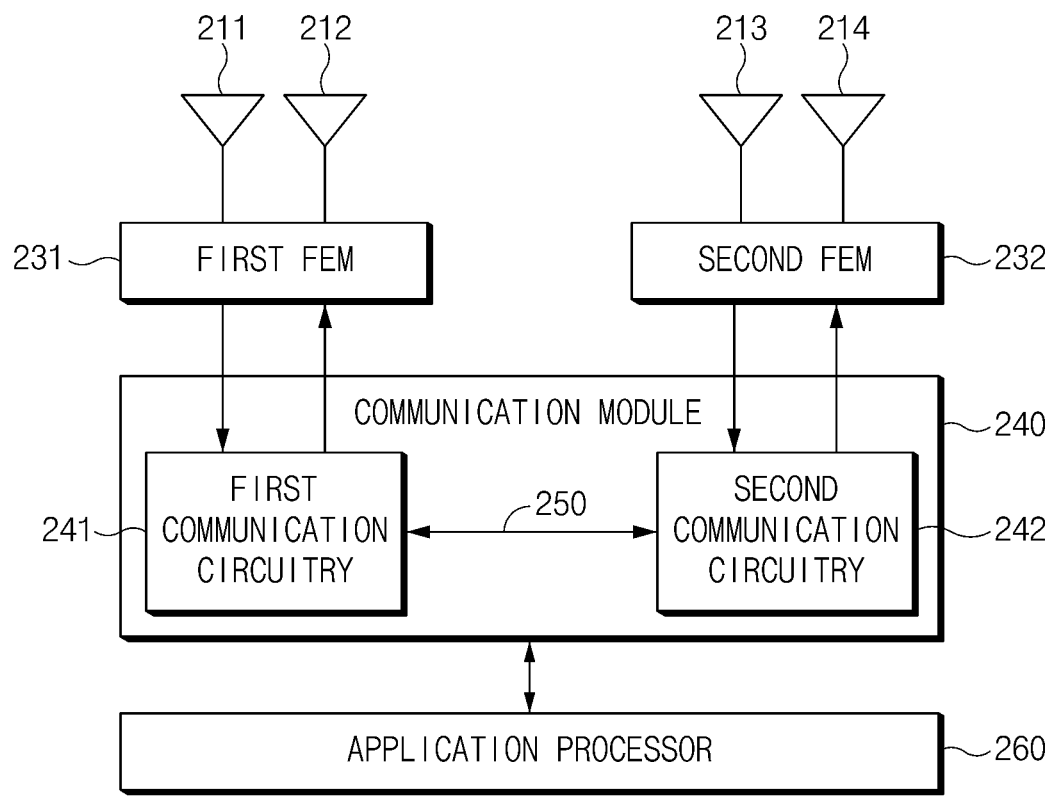
FIG. 2 is a block diagram illustrating a configuration of an electronic device according to an embodiment.

FIG. 2 is a block diagram illustrating a configuration of an electronic device according to an embodiment.

Referring to FIG. 2, the electronic device 200 may be a mobile device used by a user. The electronic device may be referred to as a mobile device, a mobile terminal, user equipment (UE), or the like.

The electronic device 200 may include a first antenna 211, a second antenna 212, a third antenna 213, a fourth antenna 214, a first front end module (FEM) 231, a second front end module 232, a communication module 240, and an application processor 260. The electronic device 200 shown in FIG. 2 may further include additional components, such as a memory and a display, other than the shown components. For example, the electronic device 200 may further include a touch integrated circuit (IC), a camera, a microphone, a speaker, a sensor, and/or the like.

The first antenna 211 and the second antenna 212 may be configured to resonate in a licensed band and an unlicensed band. For example, the first antenna 211 may be configured to resonate in the licensed band, and the second antenna 212 may be configured to resonate in the unlicensed band. For another example, the first antenna 211 may be configured to resonate in the licensed band and the unlicensed band, and the second antenna 212 may be configured to resonate in the unlicensed band. For another example, the first antenna 211 may be configured to resonate in the licensed band, and the second antenna 212 may be configured to resonate in the licensed band and the unlicensed band. For another example, the first antenna 211 and the second antenna 212 may be configured to resonate in the licensed band the unlicensed band, respectively. The electronic device may transmit or receive an LTE signal in the licensed band and an LTE signal in the unlicensed band using the first antenna 211 and the second antenna 212.

The third antenna 213 and the fourth antenna 214 may be configured to resonate in the unlicensed band. For example, a Wi-Fi signal may be transmitted or received using the third antenna 213 and the fourth antenna 214.

In FIG. 2, it is shown that the electronic device 200 includes, but is not limited to, the four antennas. The electronic device 200 may include three or less antennas and may include five or more antennas.

The first front end module 231 may be electrically connected with the first antenna 211 and the second antenna 212. The first front end module 231 may process a signal received via the first antenna 211 and the second antenna 212. The first front end module 231 may process a signal transmitted from a first communication circuitry 241. For example, the first front end module 231 may divide the received signal for each band and may process each of the divided signals. The first front end module 231 may amplify a signal and may remove noise from the signal.

The second front end module 232 may be electrically connected with the third antenna 213 and the fourth antenna 214. The second front end module 232 may process a signal received via the third antenna 213 and the fourth antenna 214. The second front end module 232 may process a signal transmitted from a second communication circuitry 242. For example, the second front end module 232 may divide the received signal for each band and may process each of the divided signals. The second front end module 232 may amplify a signal and may remove noise from the signal.

The communication module 240 may be electrically connected with the first front end module 231 and the second front end module 232. The communication module 240 may include the first communication circuitry 241 and the second communication circuitry 242. The first communication circuitry 241 may be electrically connected with the first antenna 211 and the second antenna 212 via the first front end module 231. The first communication circuitry 241 may be electrically connected with the third antenna 213 and the fourth antenna 214 via the second front end module 232. The communication module 240 may be referred to as, for example, a processor or a communication processor. In FIG. 2, it is shown that the first communication circuitry 241 and the second communication circuitry 242 are included in, but is not limited to, the communication module 240. The first communication circuitry 241 and the second communication circuitry 242 may be a component independent of the communication module 240, and may be located between the front end modules 231 and 232 and the communication module 240.

The first communication circuitry 241 may process an LTE signal. The first communication circuitry 241 may be a modem configured to process the LTE signal. The first communication circuitry 241 may process an LTE signal in the licensed band and an LTE signal in the unlicensed band. The first communication circuitry 241 may perform communication according to a first communication protocol which uses an LTE signal in the licensed band and an LTE signal in the unlicensed band. The first communication protocol may be, for example, LAA or LTE-U. The first communication circuitry 241 may process an LTE signal aggregated with a Wi-Fi signal. The first communication circuitry 241 may control the first front end module 231 and may control a Tx/Rx path between the first communication circuitry 241 and the first front end module 231.

The second communication circuitry 242 may process a Wi-Fi signal. The second communication circuitry 242 may be a Wi-Fi modem configured to process the Wi-Fi signal. The second communication circuitry 242 may process a Wi-Fi signal which is a signal in the unlicensed band. The second communication circuitry 242 may perform communication according to a second communication protocol which uses a Wi-Fi signal in the unlicensed band. The second communication circuitry 242 may control the second front end module 232 and may control a Tx/Rx path between the second communication circuitry 242 and the second front end module 232.

The first communication circuitry 241 may be electrically connected with the second communication circuitry 242. The first communication circuitry 241 may be connected with the second communication circuitry 242 via a direct interface 250. For example, the first communication circuitry 241 may be connected with the second communication circuitry 242 through a universal asynchronous receiver/transmitter (UART).

According to an embodiment, the first communication circuitry 241 may obtain information about a state of a channel in the unlicensed band associated with the first communication circuitry 241 and the second communication circuitry 242 from the second communication circuitry 242. For example, the second communication circuitry 242 may obtain information about states of channels connectable with the second communication circuitry 242. The second communication circuitry 242 may set, for example, a network allocation vector (NAV) using a duration field value of a signal transmitted and received by the second communication circuitry 242. The first communication circuitry 241 may obtain information about states of channels detected by the second communication circuitry 242 from the second communication circuitry 242 via the direct interface 250. The first communication circuitry 241 may obtain information about a state of a channel connected with the first communication circuitry 241 among the obtained information. The first communication circuitry 241 may obtain only information about a state of a channel connected with the first communication circuitry 241 from the second communication circuitry 242.

According to an embodiment, when a Wi-Fi signal received by the second communication circuitry 242 is greater in intensity than a specified value, the first communication circuitry 241 may obtain information about a state of a channel. For example, when a Wi-Fi access point (e.g., a first Wi-Fi access point 104) is outside the coverage of a base station, the base station (e.g., a base station 102 of FIG. 1) may fail to detect the Wi-Fi access point (hidden node). In this case, although the first communication circuitry 241 receives a signal from both the base station and the Wi-Fi access point, when an LTE signal is greater in intensity than a Wi-Fi signal, the first communication circuitry 241 may receive an LTE signal in the unlicensed band from the base station by a capture effect. When it is able to receive an LTE signal in the unlicensed band from the base station, because it is not necessary to perform an operation for saving power consumption, the first communication circuitry 241 may obtain information about a state of a channel only when a Wi-Fi signal is greater in intensity than a specified value.

According to an embodiment, the information about the state of the channel may be information indicating or predicting whether the channel is in a busy state or an idle state. For example, the information about the state of the channel may include at least a portion of an NAV associated with the channel, the number of Wi-Fi access points detected by the second communication circuitry 242, the number of devices which accesses the Wi-Fi access points, a signal to interference plus noise ratio (SINR) of a Wi-Fi signal received by the second communication circuitry 242, a signal to noise ratio (SNR) of the Wi-Fi signal received by the second communication circuitry 242, an interval at which a beacon is received from the Wi-Fi access point, strength of a beacon received from the Wi-Fi access point, traffic for each access category during a specified time, a contention window size for each access category during the specified time, the number of retransmission during the specified time, the number of times of accessing a channel during the specified time, or an idle channel time during the specified time.

According to an embodiment, the first communication circuitry 241 may perform various operations for reducing power consumed upon downlink and uplink. First of all, hereinafter, a description will be given of an operation for reducing power consumed upon downlink.

According to an embodiment, the first communication circuitry 241 may determine a time interval associated with processing an LTE signal in the unlicensed band based on the information about the state of the channel. For example, the first communication circuitry 241 may determine a time interval determined that the corresponding channel is in a busy state, based on the information about the state of the channel. For another example, the first communication circuitry 241 may determine a time interval expected that the corresponding channel will be in the busy state, based on the information about the state of the channel. For another example, the first communication circuitry 241 may determine a time interval when a probability of the corresponding channel being in the busy state is greater than a specified value, based on the information about the state of the channel.

For example, the first communication circuitry 241 may determine the above-mentioned time interval based on an NAV for a specific channel. The first communication circuitry 241 may detect a time interval when a Wi-Fi channel is in the busy state, based on the NAV, and may divide the time interval when the corresponding channel is in the busy state by a time corresponding to one subframe to calculate the number of subframes corresponding to a time when the corresponding channel is occupied. An exemplary equation of calculating the number of the subframes is as follows.

$$\text{Number\_of\_subframe}_{CRS\_skip} = \left\lceil \frac{Time_{NAV}}{1\,\text{ms}} \right\rceil \quad \text{[Equation 1]}$$

The first communication circuitry 241 may perform various operations for stopping processing the LTE signal in the unlicensed band in the determined subframe to reduce power consumption.

According to an embodiment, the first communication circuitry 241 may stop decoding the LTE signal in the unlicensed band during the determined time interval. To recognize whether the base station transmits data, the first communication circuit 241 may decode all or some of all LIE subframes. For example, the first communication circuitry 241 may decode all the LTE subframes or may perform CRS blind detection for all the LTE subframes. Because the corresponding channel is in the busy state during the above-mentioned determined time interval, the base station may fail to transmit data to the electronic device over the corresponding channel. Thus, decoding the subframe during the determined time interval may waste power. The first communication circuitry 241 may reduce power consumption by omitting to decode an LT signal in the unlicensed band during the determined time interval.

According to an embodiment, the first communication circuitry 241 may determine the number of subframes of an LTE signal in the unlicensed band to stop processing the LTE signal in the unlicensed band, based on the information about the state of the channel. The first communication circuitry 241 may omit decoding as many as the determined number of subframes. According to an embodiment, the first communication circuitry 241 may stop CRS blind detection for a subframe of an LTE signal in the unlicensed band received during the determined time interval. According to an embodiment, the first communication circuitry 241 may stop decoding a subframe of an LTE signal in the unlicensed band received during the determined time interval.

According to an embodiment, the first communication circuitry 241 may calculate a probability that communication will be performed in a next subframe, based on the information about the state of the channel. When the calculated probability is greater than or equal to a specified value, the first communication circuitry 241 may determine the next subframe as a time interval to stop processing an LTE signal. For example, the first communication circuitry 241 may calculate a time when communication is performed according to a first communication protocol and a time when communication is performed according to a second communication protocol, during a predetermined time interval from a current time. The first communication circuitry 241 may calculate the probability that the communication will be performed in the next subframe, based on the time when the communication is performed according to the first communication protocol and the time when the communication is performed according to the second communication protocol. An exemplary equation of calculating a probability that an LAA or LTE-U subframe will be transmitted from the base station in the next subframe is as follows.

$$\text{Transmission } Probability_{next_{subframe}} = \quad \text{[Equation 2]}$$
$$(1-\alpha)\left(1 - \text{Transmission } Probability_{During_{T_{Window_{WiFi}}}}\right) +$$
$$\alpha \text{ Transmission } Probability_{During\_T\_Window\_unlicensedLTE}$$

Here, Transmission Probability$_{nextsubframe}$ denotes the probability that the LAA or LTE-U subframe will be transmitted from the base station, Transmission Probability$_{During\_T\_Window\_WiFi}$ denotes the probability of the time when communication will be performed over Wi-Fi during the specified time T$_{Window}$, Transmission Probability$_{During\_T\_Window\_unlicensedLTE}$ denotes the probability of the time when communication is performed over LTE in the unlicensed band during the specified time T$_{Window}$, and α denotes the real number of greater than 0 and less than 1. An uplink transmission probability may be calculated to be similar to the above.

When the calculated probability is less than the specified value, the first communication circuitry 241 may stop decoding the LTE signal in the unlicensed band received in the next subframe.

According to an embodiment, the first communication circuitry 241 may deactivate at least a part of a portion associated with an LTE signal in the unlicensed band of the first front end module 231 and a portion associated with an LTE signal in the unlicensed band of the first communication circuitry 241 during the determined time interval. A part of the first front end module 231 and/or a part of the first communication circuitry 241 may process an LTE signal in the unlicensed band. The first communication circuitry 241 may deactivate a part of the first front end module 231 and/or a part of the first communication circuitry 241 during the determined time interval when data is not received using an LTE signal in the unlicensed band to save power consumption.

For example, when an Scell deactivation timer value is less than a currently determined time interval, the first communication circuitry 241 may early expire an Scell deactivation timer associated with a part of the first front end module 231 and/or a part of the first communication circuitry 241. The part of the first front end module 231 and/or the part of the first communication circuitry 241 may be deactivated by expiring the Scell deactivation timer.

Hereinafter, a description will be given of an operation for reducing power consumed upon uplink.

According to an embodiment, the first communication circuitry 241 may select at least one of a plurality of subframes assigned to the first communication circuitry 241 based on the information about the state of the channel and may transmit an LTE signal in the unlicensed band in the at least one of the plurality of subframes. The base station (e.g., the base station 102 of FIG. 1) may assign the plurality of subframes to the electronic device. Some of the plurality of assigned subframes may be overlapped with a time interval when the corresponding channel is in the busy state or a time interval when the beacon is received. In this case, because the first communication circuitry 241 is unable to transmit data in the overlapped subframe, it may transmit an LTE signal in the unlicensed band in the other subframes.

For example, the first communication circuitry 241 may receive an uplink (UL) grant for the plurality of subframes from the base station. The uplink grant may include information about the plurality of subframes assigned to the first communication circuitry 241. The first communication circuitry 241 may select at least one of the plurality of subframes based on the information about the state of the channel. The first communication circuitry 241 may select a subframe which is not overlapped with the time interval when the corresponding channel is in the busy state and the time interval when the beacon is received, using the information about the state of the channel. The first communication circuitry 241 may perform clear channel assessment (CCA) for the selected subframe. After performing the CCA, the first communication circuitry 241 may transmit data.

Figure 3:
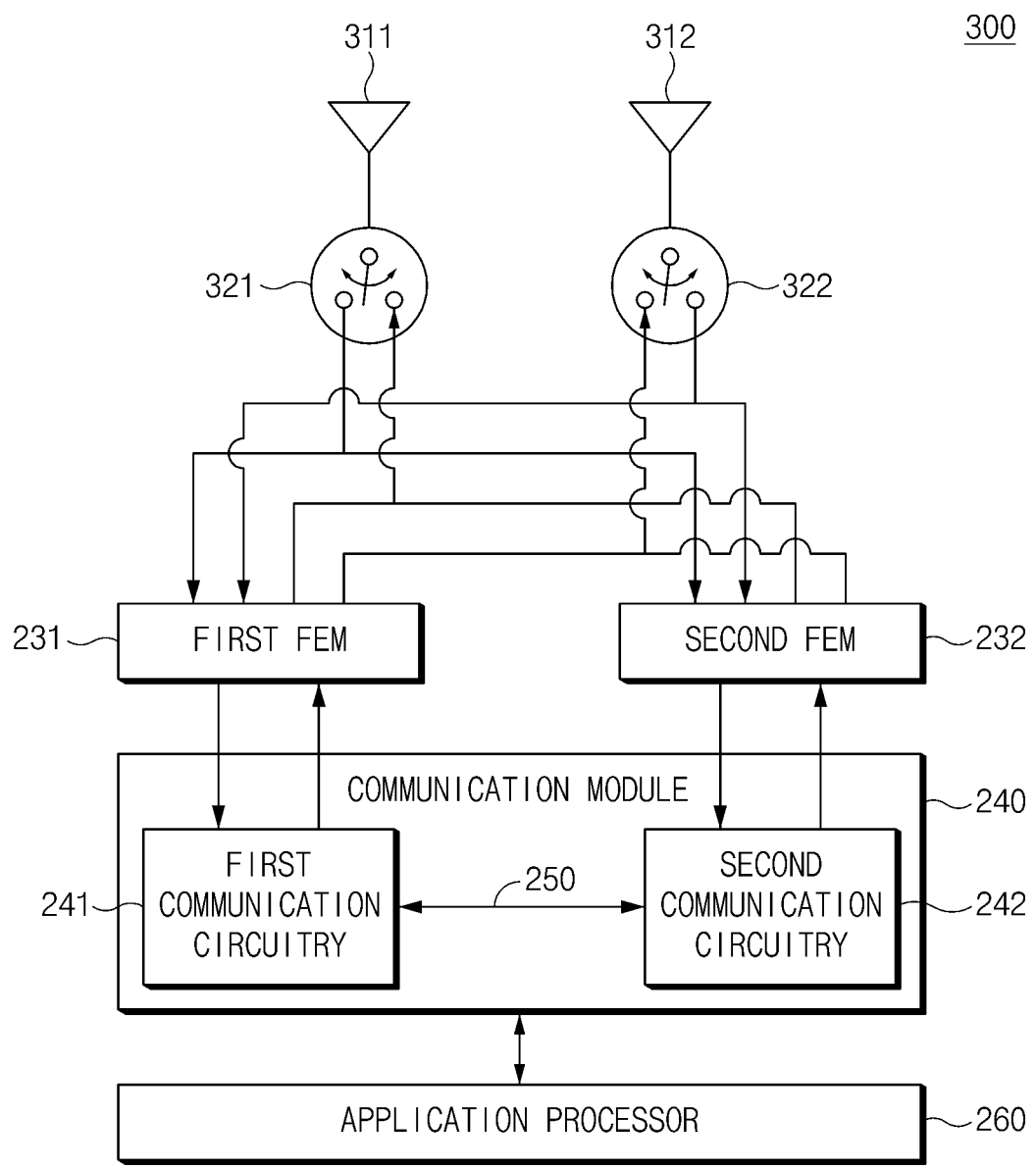
FIG. 3 is a block diagram illustrating a configuration of an electronic device according to an embodiment.

FIG. 3 is a block diagram illustrating a configuration of an electronic device according to an embodiment.

Referring to FIG. 3, an electronic device 300 may be a mobile device used by a user. The electronic device 300 may be referred to as a mobile device, a mobile terminal, user equipment, or the like.

The electronic device 300 may include a first antenna 311, a second antenna 312, a first switch 321, a second switch 322, a first front end module 231, a second front end module 232, a communication module 240, and an application processor 260. The electronic device 300 shown in FIG. 3 may further include additional components, such as a memory and a display, other than the shown components. For example, the electronic device 300 may further include a touch IC, a camera, a microphone, a speaker, a sensor, and/or the like. For convenience of description, a duplicated description of the configuration described with reference to FIG. 2 will be omitted.

The first antenna 311 and the second antenna 312 may be configured to resonate in a licensed band and an unlicensed band. For example, the first antenna 311 may be configured to resonate in the licensed band, and the second antenna 312 may be configured to resonate in the unlicensed band. For another example, the first antenna 311 may be configured to resonate in the licensed band and the unlicensed band, and the second antenna 312 may be configured to resonate in the unlicensed band. For another example, the first antenna 311 may be configured to resonate in the licensed band, and the second antenna 312 may be configured to resonate in the licensed band the unlicensed band. For another example, each of the first antenna 311 and the second antenna 312 may be configured to resonate in the licensed band the unlicensed band. The electronic device 300 may transmit or receive an LTE signal in the licensed band, an LTE signal in the unlicensed band, and a Wi-Fi signal in the unlicensed band using the first antenna 311 and the second antenna 312.

The first switch 321 may be electrically connected with the first antenna 311. The first switch 321 may selectively connect the first antenna 311 with the first front end module 231 or the second front end module 232. For example, when an LTE signal is received by the first antenna 311, the first switch 321 may connect the first antenna 311 with the first front end module 231. For another example, when a Wi-Fi signal is received by the first antenna 311, the first switch 321 may connect the first antenna 311 with the second front end module 232. The first switch 321 may be controlled by the communication module 240 or the application processor 260.

The second switch 322 may be electrically connected with the second antenna 312. The second switch 322 may selectively connect the second antenna 312 with the first front end module 231 or the second front end module 232. For example, when an LTE signal is received by the second antenna 312, the second switch 322 may connect the second antenna 312 with the first front end module 231. For another example, when a Wi-Fi signal is received by the second antenna 312, the second switch 322 may connect the second antenna 312 with the second front end module 232. The second switch 322 may be controlled by the communication module 240 or the application processor 260.

Figure 4:
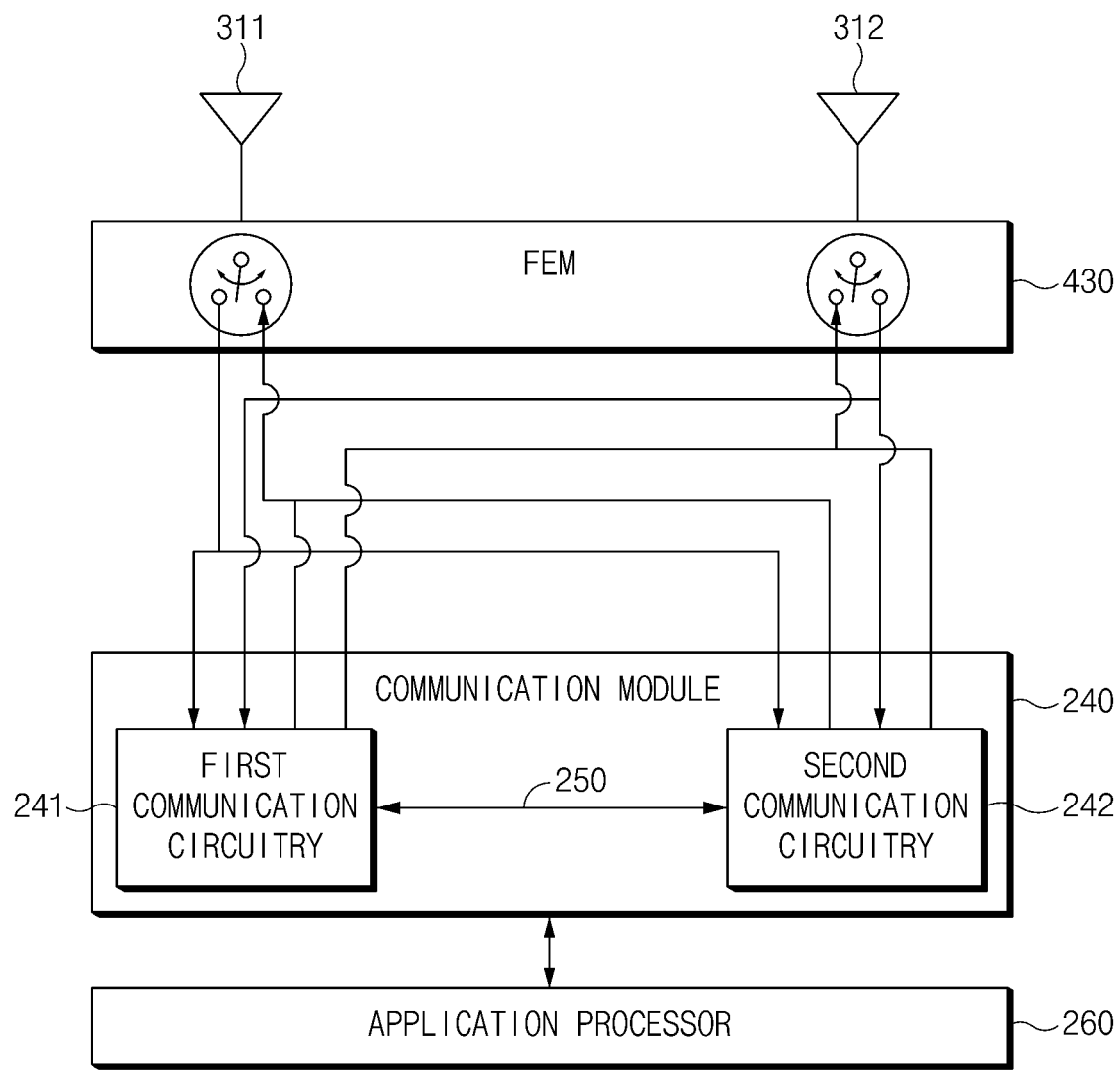
FIG. 4 is a block diagram illustrating a configuration of an electronic device according to an embodiment.

FIG. 4 is a block diagram illustrating a configuration of an electronic device according to an embodiment.

Referring to FIG. 4, an electronic device 400 may be a mobile device used by a user. The electronic device 400 may be referred to as a mobile device, a mobile terminal, user equipment, or the like.

The electronic device 400 may include a first antenna 311, a second antenna 312, a front end module 430, a communication module 240, and an application processor 260. The electronic device 400 shown in FIG. 4 may further include additional components, such as a memory and a display, other than the shown components. For example, the electronic device 400 may further include a touch IC, a camera, a microphone, a speaker, a sensor, and/or the like. For convenience of description, a duplicated description of the configuration described with reference to FIG. 2 or 3 will be omitted.

The front end module 430 may be electrically connected with the first antenna 311 and the second antenna 312. The front end module 430 may process a signal received via the first antenna 311 and the second antenna 312. The front end module 430 may process a signal delivered from the communication module 240. For example, the front end module 430 may divide the received signal for each band and may process of each of the divided signals. The front end module 430 may amplify a signal and may remove noise from the signal. For example, when a signal received by the first antenna 311 and/or the second antenna 312 is an LTE signal, the front end module 430 may deliver the LTE signal to a first communication circuitry 241. When the signal received by the first antenna 311 and/or the second antenna 312 is a Wi-Fi signal, the front end module 430 may deliver the Wi-Fi signal to a second communication circuitry 242. For another example, the front end module 430 may deliver the signal, received from the first communication circuitry 241 and/or the second communication circuitry 242, to an antenna which resonates in a frequency band of the received signal between the first antenna 311 and the second antenna 312.

Figure 5:
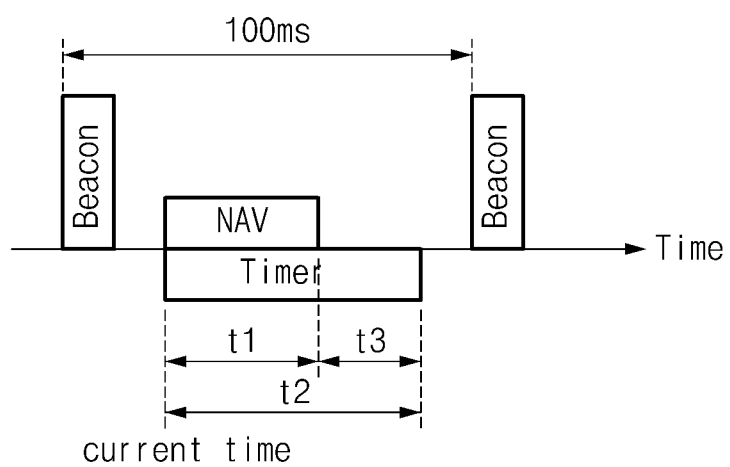
FIG. 5 illustrates an operation over a time performed in an electronic device according to an embodiment.

FIG. 5 illustrates an operation over a time performed in an electronic device according to an embodiment.

Referring to FIG. 5, the electronic device according to an embodiment may receive a Wi-Fi signal. A period when the electronic device receives a beacon may be, for example, 100 ms. The electronic device may obtain information indicating a state of a channel from the Wi-Fi signal. The electronic device may set an NAV using information in a duration field included in the Wi-Fi signal. A time expected that the corresponding channel will be in a busy state from a current time may be recognized by the NAV. For example, the time expected that the corresponding channel will be in the busy state from the current time may be t1.

According to an embodiment, the electronic device may identify a deactivation timer. The deactivation timer may indicate, for example, a time set to activate hardware (e.g., a part of a first communication circuitry and/or a part of a front end module) for processing an LTE signal in an unlicensed band although data is not received from a base station. When the deactivation timer expires, the electronic device may deactivate the hardware for processing the LTE signal in the unlicensed band. For example, a time set in the deactivation timer may be t2.

According to an embodiment, when t1 is shorter than t2, the electronic device may stop processing the LTE signal during a time interval determined based on the information about the state of the channel.

According to an embodiment, the electronic device may determine the number of subframes of the LTE signal in the unlicensed band to stop processing the LTE signal in the unlicensed band based on the information about the state of the channel. For example, when t1 is greater than 1 ms which is a time corresponding to one subframe, the electronic device may divide t1 by 1 ms and may determine a minimum integer greater than the divided value as the number of subframes to stop processing the LTE signal. The electronic device may stop decoding the LTE signal in the unlicensed band during a time corresponding to the determined number of subframes from the determined time. For example, the electronic device may stop CRS blind detection for a subframe of the LTE signal in the unlicensed band received during the time corresponding to the determined number of subframes. For another example, the electronic device may stop decoding all the subframes of the LTE signal in the unlicensed band received during the time corresponding to the determined number of subframes. The time corresponding to the determined number of subframes may be greater than t1. After the time corresponding to the determined number of subframes goes on, the electronic device may decode subframes included in t3.

According to another embodiment, the electronic device may fail to stop decoding during the time corresponding to the determined number of subframes and may stop the deactivation timer. In this case, as the time corresponding to the determined number of subframes goes on, the deactivation time may be operated again.

When t1 is greater than 0 and is less than 1 ms, that is, when t1 is shorter than a time corresponding to one subframe, the electronic device may determine whether to process the LTE signal in the unlicensed band during a time interval based on whether to support a partial subframe. For example, when the electronic device does not support the partial subframe, it may stop the CRS blind detection for one subframe corresponding to t1. The electronic device may stop decoding all of one subframe corresponding to t1. A time when the decoding is stopped may be 1 ms and may be longer than t1. For another example, when the electronic device supports the partial subframe, it may receive and decode an LTE signal in the unlicensed band in the partial frame which is adjacent to t1 and is included in t3. After time t1 goes on, the electronic device may receive and decode an LTE signal in the unlicensed band in the partial subframe included in t3 and a subframe.

Figure 6:
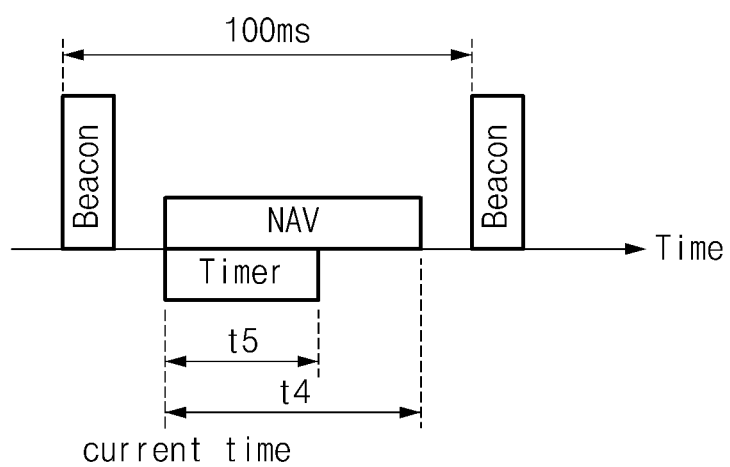
FIG. 6 illustrates an operation over a time performed in an electronic device according to an embodiment.

FIG. 6 illustrates an operation over a time performed in an electronic device according to an embodiment.

Referring to FIG. 6, the electronic device according to an embodiment may receive a Wi-Fi signal. A period when the electronic device receives a beacon may be, for example, 100 ms. The electronic device may set an NAV based on information included in a duration field included in the Wi-Fi signal. For example, a time expected that the corresponding channel will be in a busy state from the current time may be t4.

According to an embodiment, the electronic device may identify a deactivation timer. For example, a time set in the deactivation timer may be t5.

According to an embodiment, when t4 is longer than t5, the electronic device may deactivate hardware associated with an LTE signal in an unlicensed band based on information about a state of a channel.

According to an embodiment, the electronic device may deactivate at least a part of a portion associated with an LIE signal in an unlicensed band of a first communication circuitry or a portion associated with an LTE signal of an unlicensed band of a front end module during a time interval determined based on the information about the state of the channel. For example, the first communication circuitry may early expire the deactivation timer. As shown in FIG. 6, when t4 is longer than t5, because the corresponding channel is in a busy state when the deactivation timer expires, the electronic device may fail to receive LTE data over the corresponding channel. Thus, when t4 is longer than t5, the electronic device may immediately expire the deactivation timer to save power consumed by a part of the first communication circuit and/or a part of the front end module.

Figure 7:
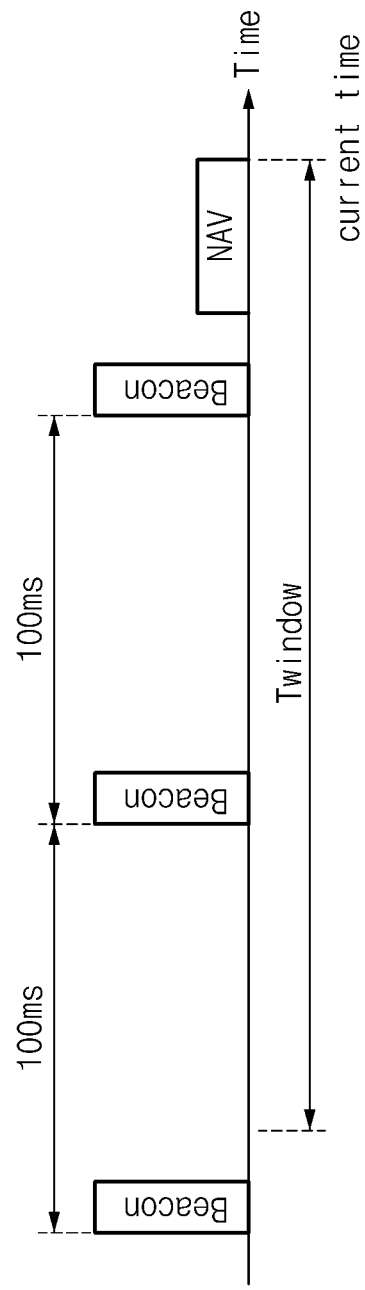
FIG. 7 illustrates an operation over a time performed in an electronic device according to an embodiment.

FIG. 7 illustrates an operation over a time performed in an electronic device according to an embodiment.

Referring to FIG. 7, the electronic device according to an embodiment may receive a Wi-Fi signal. A period when the electronic device receives a beacon may be, for example, 100 ms. The electronic device may obtain information indicating a state of a channel from the Wi-Fi signal. The electronic device may set an NAV based on information included in a duration field included in the Wi-Fi signal. A time expected that the corresponding channel will be in a busy state from a current time may be recognized by the NAV. In the current time, the time expected that the corresponding channel will be in the busy state may be 0.

According to an embodiment, when the time expected that the corresponding channel will be in the busy state is 0, the electronic device may calculate a probability that the corresponding channel will be in the busy state in a next subframe. When the calculated probability is greater than a specified value, the electronic device may stop processing an LTE signal in an unlicensed band in the next subframe.

According to an embodiment, the electronic device may calculate a probability that communication will be performed over the corresponding channel in the next subframe based on the information about the state of the channel. When the calculated probability is greater than the specified value, the electronic device may determine the next subframe as a time interval for stopping processing the LTE signal of the unlicensed band. For example, the electronic device may obtain a time when communication is performed in LIE over the corresponding channel during $T_{window}$ which is a specified time interval from the current time and a time when communication is performed in Wi-Fi. The electronic device may calculate a probability that communication will be performed in LTE during Twindow over the corresponding channel and a probability that communication will be performed in Wi-Fi by dividing each of the obtained times by Twindow. The electronic device may calculate movement average for a probability that communication will be performed in LTE and a probability that communication will be performed in Wi-Fi, as a probability that communication will be performed over the corresponding channel in the next subframe. When the calculated probability is greater than a specified value, the electronic device may stop decoding an LTE signal in the unlicensed band received in the next subframe. When the calculated probability is greater than the specified value, the electronic device may deactivate at least a part of a portion associated with an LTE signal in an unlicensed band of a first communication circuitry and a portion associated with an LTE signal in an unlicensed band of a front end module during the next subframe.

Figure 8:
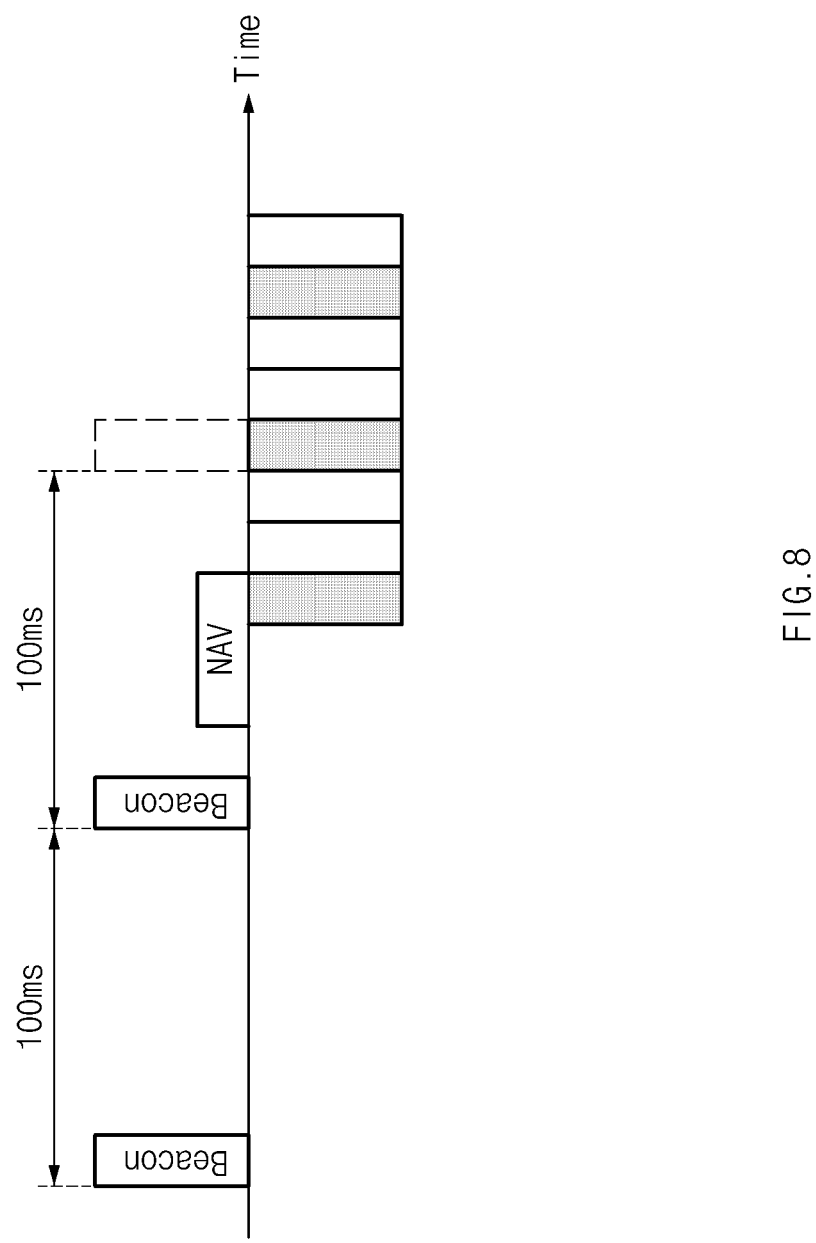
FIG. 8 illustrates an operation over a time performed in an electronic device according to an embodiment.

FIG. 8 illustrates an operation over a time performed in an electronic device according to an embodiment.

Referring to FIG. 8, the electronic device according to an embodiment may receive a Wi-Fi signal. A period when the electronic device receives a beacon may be, for example, 100 ms. The electronic device may set an NAV using a duration field included in the Wi-Fi signal.

According to an embodiment, the electronic device may receive an uplink (UL) grant for a plurality of subframes from a base station. For example, the electronic device may receive an uplink grant for three of eight consecutive subframes. The electronic device may attempt to transmit data using an LTE signal of an unlicensed band in, for example, a first subframe, a fourth subframe, and a seventh subframe, which are shown in FIG. 8.

According to an embodiment, the electronic device may select at least one of the plurality of subframes based on information about a state of a channel. For example, the first subframe may be include in a time interval expected that the corresponding channel will be in a busy state based on an NAV. The fourth subframe may be included in a time interval expected that a beacon will be received. The seventh subframe may be included in a time interval expected that the corresponding channel will be in an idle state. In this case, the electronic device may select the seventh subframe among the first subframe, the fourth subframe, and the seventh subframe and may fail to attempt to perform uplink transmission in the first and fourth subframes.

The electronic device may perform CCA for the selected subframe. For example, the electronic device may perform the CCA for only the seventh subframe among the first subframe, the fourth subframe, and the seventh subframe, which are assigned to the electronic device. After performing the CCA, the electronic device may transmit data in the seventh subframe. In this case, because the CCA, for the first subframe and the fourth subframe in which data is unable to be transmitted because the corresponding channel is in the busy state, is skipped, unnecessary power consumption may be reduced.

Figure 9:
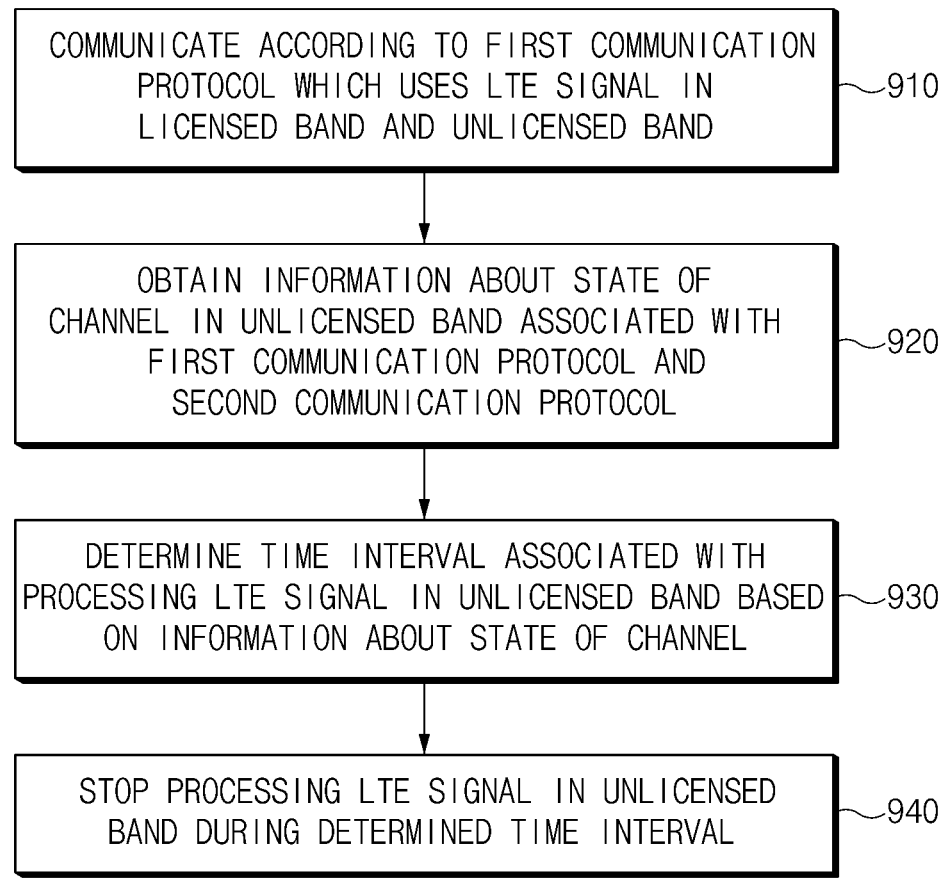
FIG. 9 is a flowchart illustrating a communication method of an electronic device according to an embodiment.

FIG. 9 is a flowchart illustrating a communication method of an electronic device according to an embodiment.

Hereinafter, it is assumed that an electronic device 100 of FIG. 1, an electronic device 200 of FIG. 2, an electronic device 300 of FIG. 3, or an electronic device 400 of FIG. 4 performs a process of FIG. 9. Furthermore, in a description of FIG. 9, an operation described as being performed by the electronic device may be understood as being controlled by a first communication circuitry 241 or an application processor 260 of the electronic device 200, 300, or 400.

Referring to FIG. 9, in operation 910, the electronic device may communicate according to a first communication protocol using an LTE signal in a licensed band and an unlicensed band. For example, the electronic device may communicate according to a communication protocol, such as LAA or LTE-U.

In operation 920, the electronic device may obtain information about a state of a channel in the unlicensed band associated with the first communication protocol and a second communication protocol. For example, the electronic device may obtain information about a state of a channel which receives an LTE signal in the unlicensed band from a Wi-Fi signal. The electronic device may obtain an NAV associated with a duration field of the Wi-Fi signal received over the corresponding channel.

In operation 930, the electronic device may determine a time interval associated with processing the LTE signal in the unlicensed band based on the information about the state of the channel. For example, the electronic device may determine a time interval expected that the corresponding channel will be in a busy state based on the NAV. The electronic device may determine the time interval expected that the corresponding channel will be in the busy state as a time interval to stop processing an LTE signal in the unlicensed band received over the corresponding channel.

In operation 940, the electronic device may stop processing the LTE signal in the unlicensed band during the determined time interval. For example, the electronic device may stop decoding the LTE signal in the unlicensed band received over the corresponding channel during the determined time interval. For another example, the electronic device may deactivate a component (e.g., a part of a communication circuitry or a part of a front end module) associated with processing the LTE signal in the unlicensed band during the determined time interval.

Figure 10:
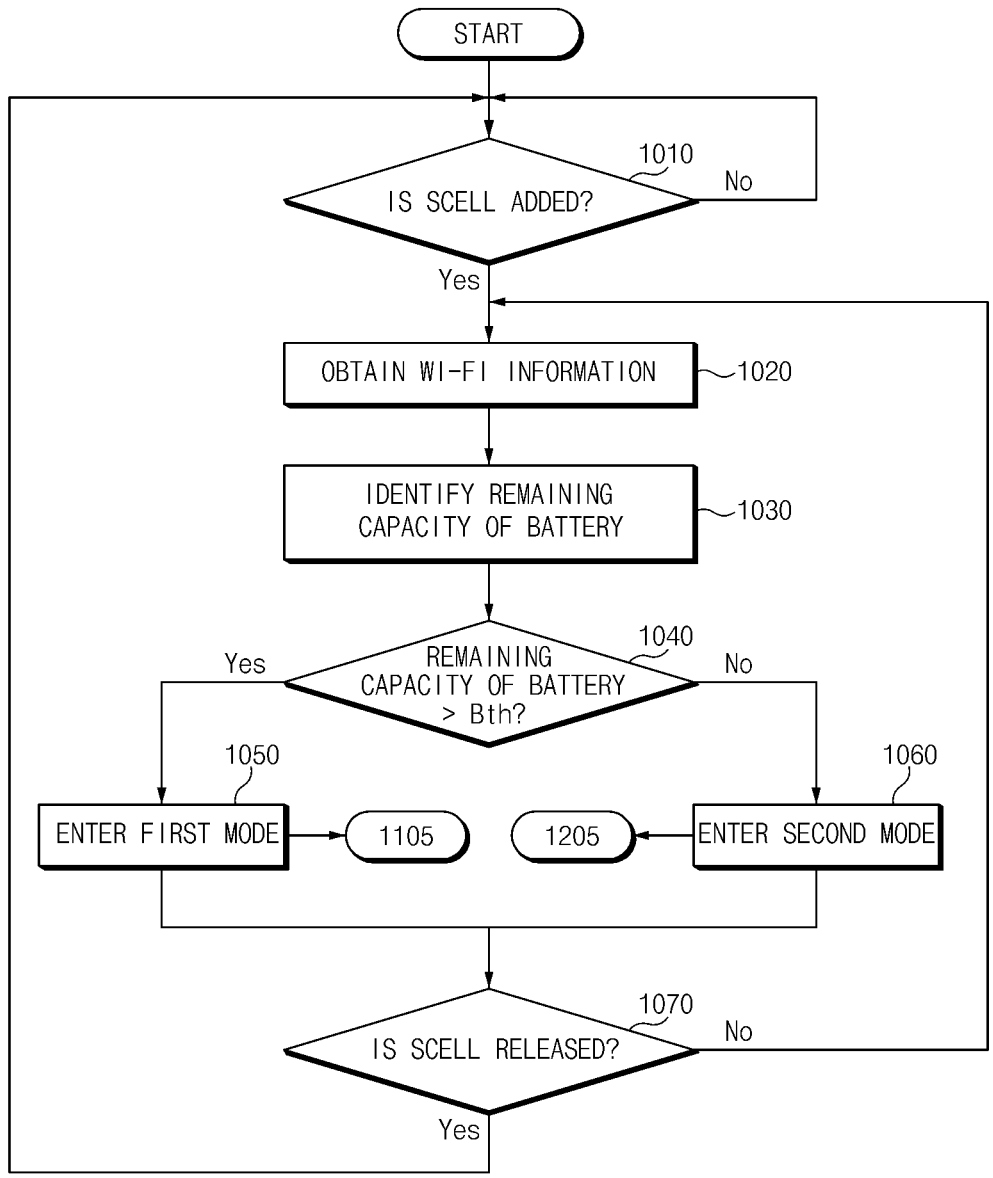
FIG. 10 is a flowchart illustrating a communication method of an electronic device according to an embodiment.

FIG. 10 is a flowchart illustrating a communication method of an electronic device according to an embodiment.

Hereinafter, it is assumed that an electronic device 100 of FIG. 1, an electronic device 200 of FIG. 2, an electronic device 300 of FIG. 3, or an electronic device 400 of FIG. 4 performs a process of FIG. 10. Furthermore, in a description of FIG. 10, an operation described as being performed by the electronic device may be understood as being controlled by a first communication circuitry 241 or an application processor 260 of the electronic device 200, 300, or 400.

According to an embodiment, the electronic device may set an operation mode based on a state of a battery included in the electronic device and may determine a time interval associated with processing an LTE signal in an unlicensed band based on the operation mode and information about a state of a channel.

Referring to FIG. 10, in operation 1010, the electronic device may determine whether an Scell is added. For example, the electronic device may determine whether it is connected with the Scell for LAA or LTE-U communication.

When the Scell is added, in operation 1020, the electronic device may obtain Wi-Fi information. For example, the electronic device may obtain information included in a Wi-Fi signal received over a channel connected with the Scell.

In operation 1030, the electronic device may identify remaining capacity of a battery included in the electronic device. For example, the electronic device may obtain information about the remaining capacity of the battery by means of a power management integrated circuit (PMIC).

In operation 1040, the electronic device may determine whether the remaining capacity of the battery is less than a threshold Bth. For example, the electronic device may determine whether the remaining capacity of the battery is less than the threshold when a specified event occurs and may periodically determine whether the remaining capacity of the battery is less than the threshold.

When the remaining capacity of the battery is greater than the threshold Bth, in operation 1050, the electronic device may enter a first mode (e.g., a guaranteed mode). When entering the first mode, the electronic device may save power consumption without degradation of communication performance. When entering the first mode, the electronic device may perform operations shown in FIG. 11.

When the remaining capacity of the battery is less than or equal to the threshold Bth, in operation 1060, the electronic device may enter a second mode (e.g., a probability mode). When entering the second mode, the electronic device may more save power consumption than the first mode. When entering the second mode, the electronic device may perform operations shown in FIG. 12.

In operation 1070, the electronic device may determine whether the Scell is released. For example, the electronic device may repeatedly perform at least some of operations 1020 to 1060 until the Scell is released. When the Scell is released, the electronic device may stop the above-mentioned operations until the Scell is added again.

According to another embodiment, the electronic device may set an operation mode based on selection of a user of the electronic device and may determine a time interval associated with processing an LTE signal in an unlicensed band based on the operation mode and information about a state of a channel. For example, the electronic device may output a user interface capable of selecting the first mode or the second mode and may enter the first mode or the second mode based on the selection of the user.

According to another embodiment, the electronic device may set an operation mode based on the number of Wi-Fi access points detected by a second communication circuitry or the number of devices which accesses the Wi-Fi access points and may determine a time interval associated with processing an LTE signal in an unlicensed band based on the operation mode and information about a state of a channel. For example, when the number of Wi-Fi access points or the number of devices which accesses the Wi-Fi access points is greater than a specified number, the electronic device may determine that an environment around the electronic device is congested and may enter the second mode.

Figure 11:
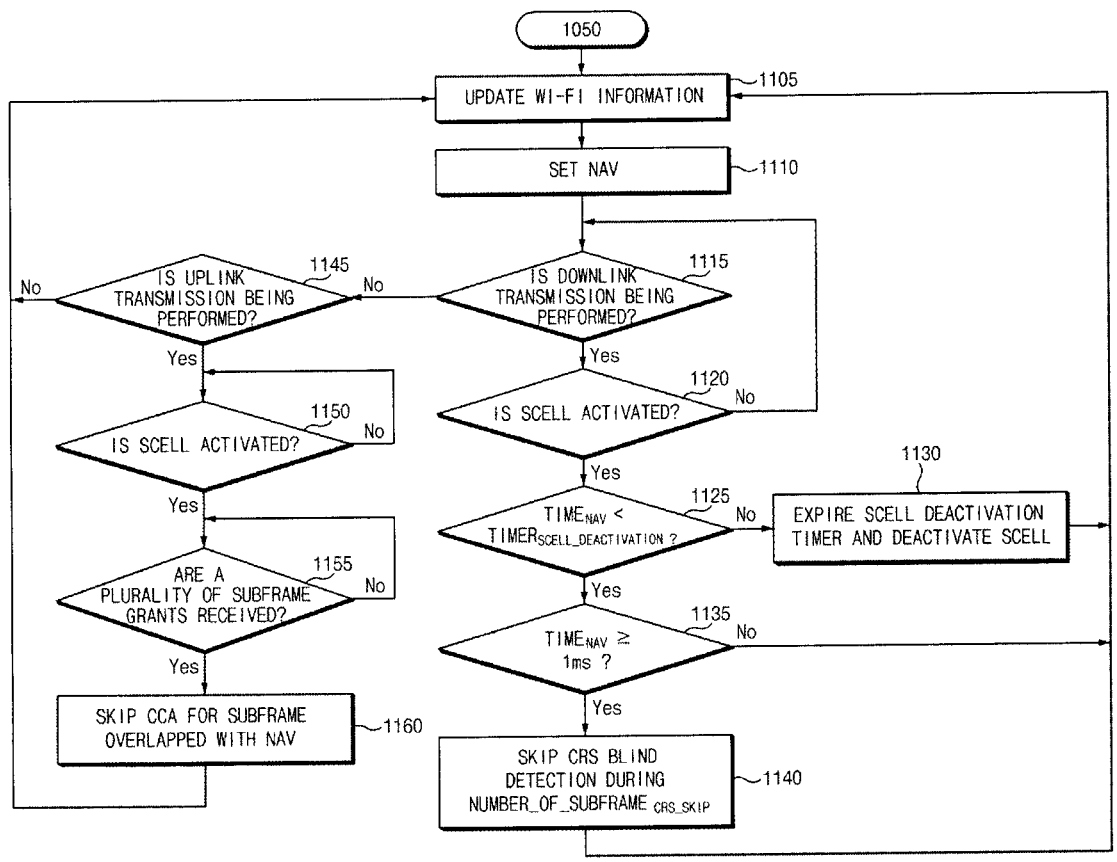
FIG. 11 is a flowchart illustrating a communication method of an electronic device according to an embodiment.

FIG. 11 is a flowchart illustrating a communication method of an electronic device according to an embodiment.

Hereinafter, it is assumed that an electronic device 100 of FIG. 1, an electronic device 200 of FIG. 2, an electronic device 300 of FIG. 3, or an electronic device 400 of FIG. 4 performs a process of FIG. 11. Furthermore, in a description of FIG. 11, an operation described as being performed by the electronic device may be understood as being controlled by a first communication circuitry 241 or an application processor 260 of the electronic device 200, 300, or 400.

Referring to FIG. 11, in operation 1105, the electronic device may update Wi-Fi information. For example, the electronic device may update Wi-Fi information obtained in operation 1020 to the Wi-Fi information obtained in operation 1105.

In operation 1110, the electronic device may set an NAV. For example, the electronic device may set the NAV including information about a time expected that the corresponding channel will be in a busy state based on the Wi-Fi information.

In operation 1115, the electronic device may determine whether downlink transmission is being performed. For example, the electronic device may determine whether the downlink transmission is being performed using an LTE signal in an unlicensed band.

When the downlink transmission is being performed, in operation 1120, the electronic device may determine whether an Scell is activated. For example, the electronic device may determine whether the Scell added over the corresponding channel is activated.

When the Scell is activated, in operation 1125, the electronic device may determine whether $Time_{NAV}$ is less than $Timer_{Scell\_deactivation}$. For example, the electronic device may determine whether a time expected that the corresponding channel will be in the busy state is shorter than a time indicated by an Scell deactivation timer.

When $Time_{NAV}$ is greater than or equal to $Timer_{Scell\_deactivation}$, in operation 1130, the electronic device may expire the Scell deactivation timer and may deactivate the Scell. For example, when the time expected that the corresponding channel will be in the busy state is longer than the time indicated by the Scell deactivation timer, because there is no probability that communication will be performed over the Scell during $Time_{NAV}$, the electronic device may expire the S cell deactivation timer.

When $Time_{NAV}$ is less than $Timer_{Scell\_deactivation}$, in operation 1135, the electronic device may determine whether $Time_{NAV}$ is greater than or equal to 1 ms. For example, the electronic device may determine whether the time expected that the corresponding channel will be in the busy state is greater than or equal to a time corresponding to one subframe.

When $Time_{NAV}$ is greater than or equal to 1 ms, in operation 1140, the electronic device may skip CRS blind detection during $Number\_of\_subframe_{CRS\_skip}$. For example, the electronic device may skip the CRS blind detection for subframes including $Time_{NAV}$.

When the downlink transmission is not being performed, in operation 1145, the electronic device may determine whether uplink transmission is being transmitted. For example, the electronic device may determine whether the uplink transmission is being transmitted using an LTE signal in an unlicensed band.

When the uplink transmission is being performed, in operation 1150, the electronic device may determine whether the Scell is activated.

When the Scell is activated, in operation 1155, the electronic device may determine whether a plurality of subframe grants are received. For example, the electronic device may determine whether a plurality of subframes are assigned to the electronic device based on an uplink grant received from a base station.

When the plurality of subframe grants are received, in operation 1160, the electronic device may skip CCA for a subframe overlapped with the NAV. For example, the electronic device may skip the CCA for a subframe overlapped with $Time_{NAV}$ among the plurality of subframes and may fail to perform the uplink transmission.

Figure 12:
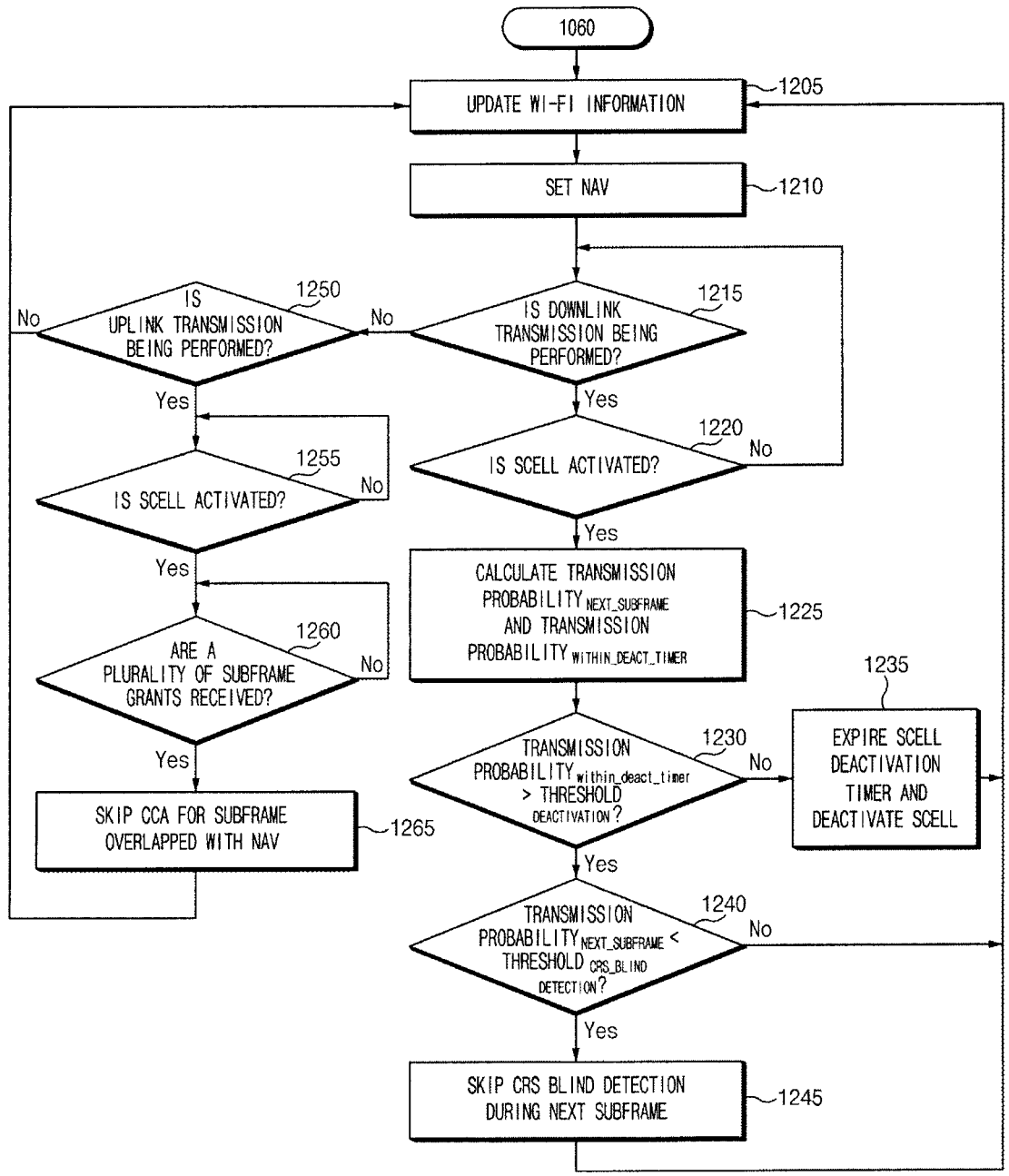
FIG. 12 is a flowchart illustrating a communication method of an electronic device according to an embodiment.

FIG. 12 is a flowchart illustrating a communication method of an electronic device according to an embodiment.

Hereinafter, it is assumed that an electronic device 100 of FIG. 1, an electronic device 200 of FIG. 2, an electronic device 300 of FIG. 3, or an electronic device 400 of FIG. 4 performs a process of FIG. 12. Furthermore, in a description of FIG. 12, an operation described as being performed by the electronic device may be understood as being controlled by a first communication circuitry 241 or an application processor 260 of the electronic device 200, 300, or 400.

Referring to FIG. 12, in operation 1205, the electronic device may update Wi-Fi information.

In operation 1210, the electronic device may set an NAV.

In operation 1215, the electronic device may determine whether downlink transmission is being performed.

When the downlink transmission is being performed, in operation 1220, the electronic device may determine whether an Scell is activated.

When the Scell is activated, in operation 1225, the electronic device may calculate $Probability_{next\ subframe}$ and $Transmission\ Probability_{within\ deact\ timer}$.

For example, the electronic device may calculate a probability that communication will be performed in a next subframe and a probability that communication will be performed during a time indicated by an Scell deactivation timer.

In operation 1230, the electronic device may determine whether Transmission Probability$_{within\_deact\_timer}$ is greater than a threshold Threshold$_{deactivation}$. For example, the electronic device may determine whether the probability that the communication will be performed during the time indicated by the Scell deactivation timer is greater than the threshold.

When Transmission Probability$_{within\_deact\_timer}$ is less than or equal to the threshold Threshold$_{deactivation}$, in operation 1235, the electronic device may expire the Scell deactivation timer and may deactivate the Scell. For example, the probability that the communication will be performed during the time indicated by the Scell deactivation timer is sufficiently low, the electronic device may immediately expire the S cell deactivation timer.

When Transmission Probability$_{within\_deact\_timer}$ is greater than the threshold Threshold$_{deactivation}$, in operation 1240, the electronic device may determine whether Transmission Probability$_{next\_subframe}$ is less than a threshold Threshold$_{CRS\_blind\_detection}$. For example, the electronic device may determine whether a probability that communication will be performed in the next subframe is less than the threshold.

When Transmission Probability$_{next\_subframe}$ is less than the threshold Threshold$_{CRS\_blind\_detection}$, in operation 1245, the electronic device may skip CRS blind detection during the next subframe. For example, when the probability that the communication will be performed in the next subframe is sufficiently low, the electronic device may skip the CRS blind detection for the next subframe.

When the downlink transmission is not being performed, in operation 1250, the electronic device may determine whether uplink transmission is being performed.

When the uplink transmission is being performed, in operation 1255, the electronic device may determine whether the Scell is activated.

When the SCell is activated, in operation 1260, the electronic device may determine whether a plurality of subframe grants are received.

When the plurality of subframe grants are received, in operation 1265, the electronic device may skip CCA for a subframe overlapped with the NAV.

Figure 13:
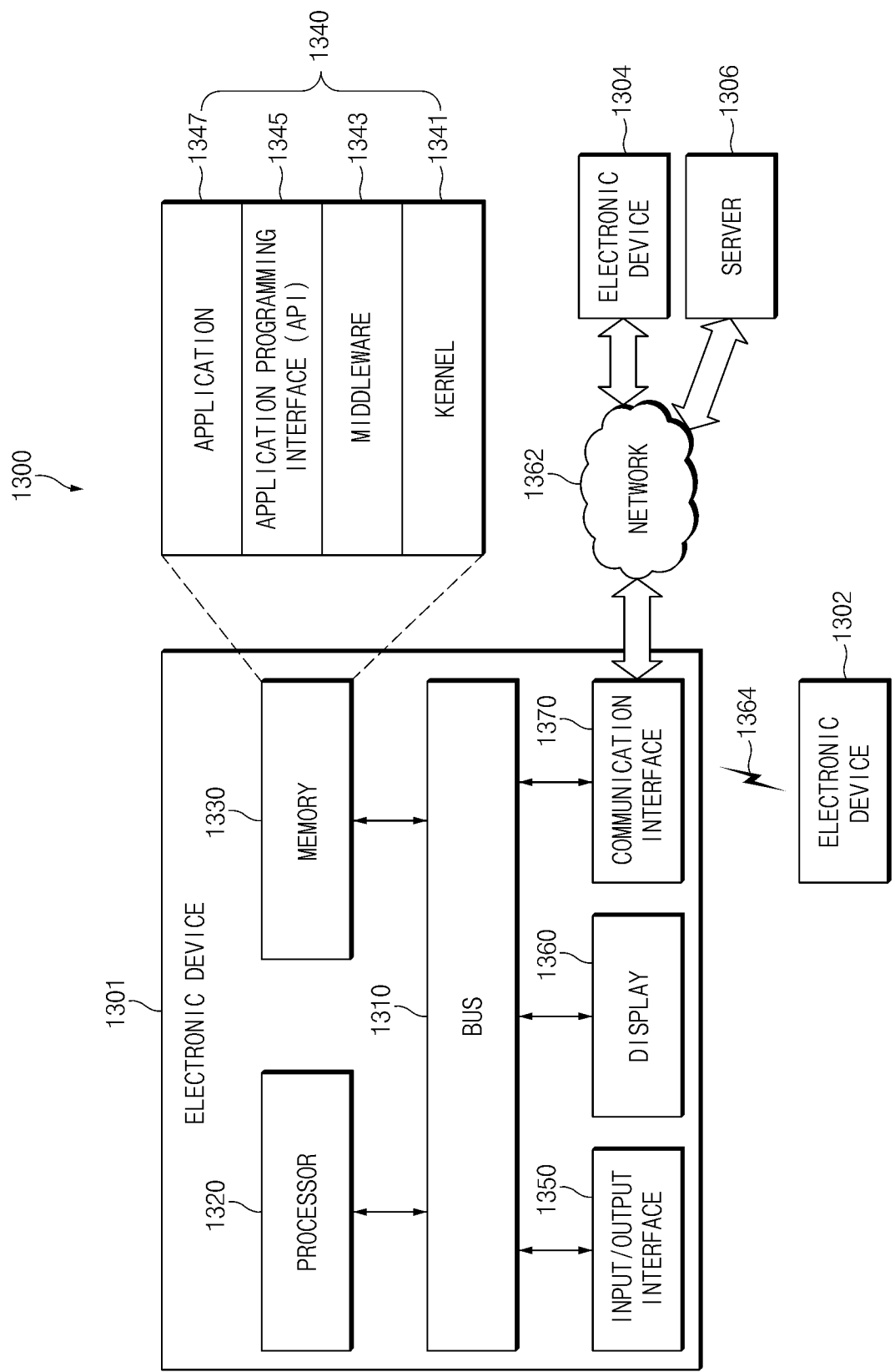
FIG. 13 illustrates an electronic device in a network environment according to various embodiments.

FIG. 13 illustrates an electronic device 1301 in a network environment 1300 according to various embodiments. Referring to FIG. 13, the electronic device 1301 may include a bus 1310, a processor 1320, a memory 1330, an input/output interface 1350, a display 1360, and a communication interface 1370. According to an embodiment, the electronic device 1301 may not include at least one of the above-described components or may further include other component(s). The bus 1310 may interconnect the above-described components 1310 to 1370 and may include a circuit for conveying communications (e.g., a control message and/or data) among the above-described components. The processor 1320 may include one or more of a central processing unit (CPU), an application processor (AP), or a communication processor (CP). For example, the processor 1320 may perform an arithmetic operation or data processing associated with control and/or communication of at least other components of the electronic device 1301.

The memory 1330 may include a volatile and/or nonvolatile memory. For example, the memory 1330 may store instructions or data associated with at least one other component(s) of the electronic device 1301. According to an embodiment, the memory 1330 may store software and/or a program 1340. The program 1340 may include, for example, a kernel 1341, a middleware 1343, an application programming interface (API) 1345, and/or an application program (or "an application") 1347. At least a part of the kernel 1341, the middleware 1343, or the API 1345 may be referred to as an "operating system (OS)". For example, the kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application program 1347 to access discrete components of the electronic device 1301 so as to control or manage system resources.

The middleware 1343 may perform, for example, a mediation role such that the API 1345 or the application program 1347 communicates with the kernel 1341 to exchange data. Furthermore, the middleware 1343 may process one or more task requests received from the application program 1347 according to a priority. For example, the middleware 1343 may assign the priority, which makes it possible to use a system resource (e.g., the bus 1310, the processor 1320, the memory 1330, or the like) of the electronic device 1301, to at least one of the application program 1347 and may process the one or more task requests. The API 1345 may be an interface through which the application program 1347 controls a function provided by the kernel 1341 or the middleware 1343, and may include, for example, at least one interface or function (e.g., an instruction) for a file control, a window control, image processing, a character control, or the like. The input/output interface 1350 may transmit an instruction or data input from a user or another external device, to other component(s) of the electronic device 1301 or may output an instruction or data, received from other component(s) of the electronic device 1301, to a user or another external device.

The display 1360 may include, for example, a liquid crystal display (LCD), a light-emitting diode (LED) display, an organic LED (OLED) display, a microelectromechanical systems (MEMS) display, or an electronic paper display. The display 1360 may display, for example, various contents (e.g., a text, an image, a video, an icon, a symbol, and the like) to a user. The display 1360 may include a touch screen and may receive, for example, a touch, gesture, proximity, or hovering input using an electronic pen or a part of a user's body. For example, the communication interface 1370 may establish communication between the electronic device 1301 and an external device (e.g., the first electronic device 1302, the second electronic device 1304, or the server 1306). For example, the communication interface 1370 may be connected to the network 1362 over wireless communication or wired communication to communicate with the external device (e.g., the second electronic device 1304 or the server 1306).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like.

According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 1362 may include at least one of telecommunications networks, for example, a computer network (e.g., LAN or WAN), an Internet, or a telephone network.

Each of the first and second external electronic devices 1302 and 1304 may be a device of which the type is different from or the same as that of the electronic device 1301. According to various embodiments, all or a portion of operations that the electronic device 1301 will perform may be executed by another or plural electronic devices (e.g., the electronic device 1302 or 1304 or the server 1306). According to an embodiment, in the case where the electronic device 1301 executes any function or service automatically or in response to a request, the electronic device 1301 may not perform the function or the service internally, but, alternatively additionally, it may request at least a portion of a function associated with the electronic device 1301 at other electronic device (e.g., the electronic device 1302 or 1304 or the server 1306). The other electronic device (e.g., the electronic device 1302 or 1304 or the server 1306) may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
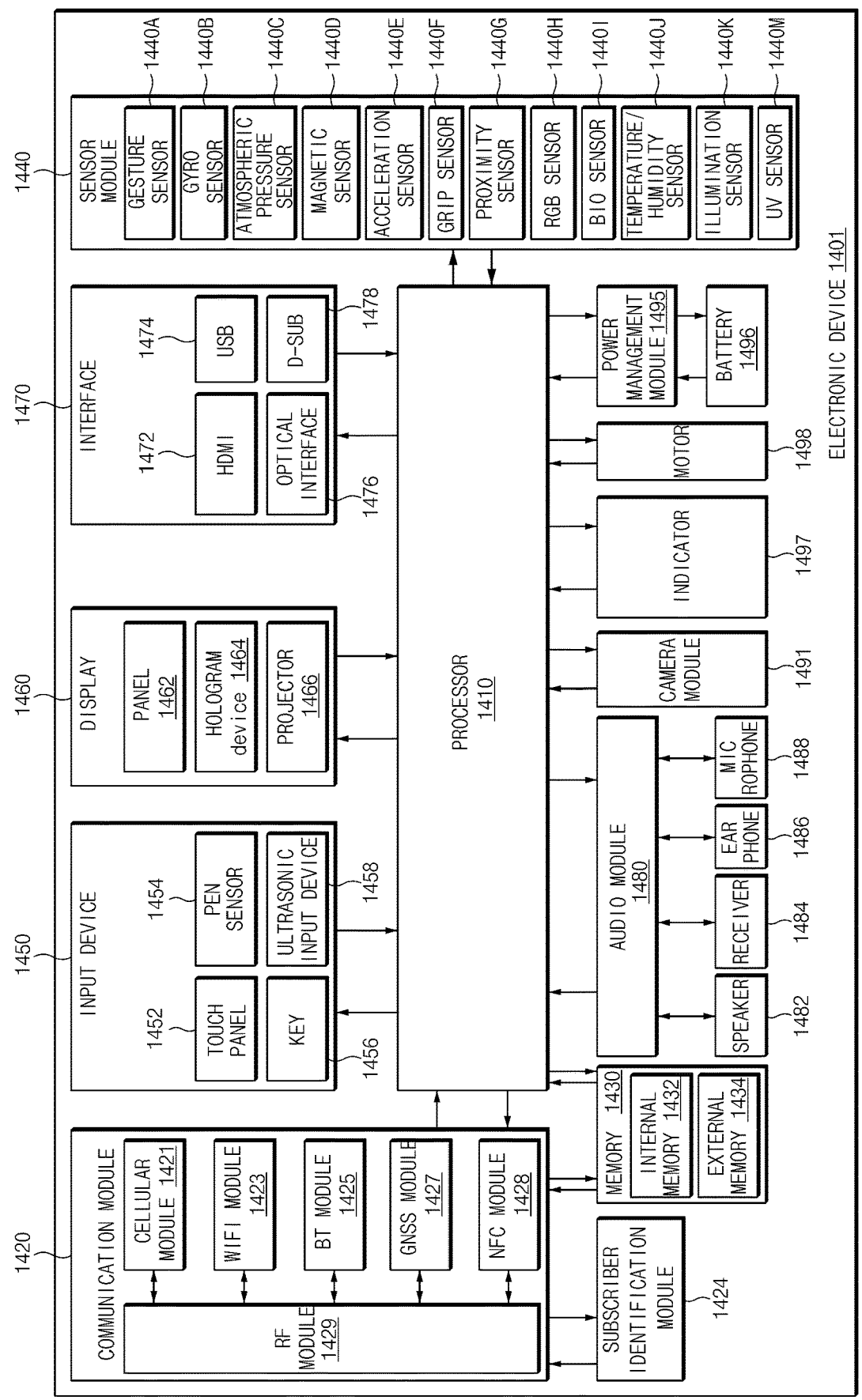
FIG. 14 illustrates a block diagram of an electronic device according to various embodiments.

FIG. 14 illustrates a block diagram of an electronic device 1401, according to various embodiments. An electronic device 1401 may include, for example, all or a part of the electronic device 1301 illustrated in FIG. 13. The electronic device 1401 may include one or more processors (e.g., an application processor (AP)) 1410, a communication module 1420, a subscriber identification module 1424, a memory 1430, a sensor module 1440, an input device 1450, a display 1460, an interface 1470, an audio module 1480, a camera module 1491, a power management module 1495, a battery 1496, an indicator 1497, and a motor 1498. The processor 1410 may drive, for example, an operating system (OS) or an application to control a plurality of hardware or software components connected to the processor 1410 and may process and compute a variety of data. For example, the processor 1410 may be implemented with a System on Chip (SoC). According to an embodiment, the processor 1410 may further include a graphic processing unit (GPU) and/or an image signal processor. The processor 1410 may include at least a part (e.g., a cellular module 1421) of components illustrated in FIG. 14. The processor 1410 may load a command or data, which is received from at least one of other components (e.g., a nonvolatile memory), into a volatile memory and process the loaded instruction or data. The processor 1410 may store result data in the nonvolatile memory.

The communication module 1420 may be configured the same as or similar to the communication interface 1370 of FIG. 13. The communication module 1420 may include the cellular module 1421, a Wi-Fi module 1423, a Bluetooth (BT) module 1425, a GNSS module 1427, a near field communication (NFC) module 1428, and a radio frequency (RF) module 1429. The cellular module 1421 may provide, for example, voice communication, video communication, a character service, an Internet service, or the like over a communication network. According to an embodiment, the cellular module 1421 may perform discrimination and authentication of the electronic device 1401 within a communication network by using the subscriber identification module (e.g., a SIM card) 1424. According to an embodiment, the cellular module 1421 may perform at least a portion of functions that the processor 1410 provides. According to an embodiment, the cellular module 1421 may include a communication processor (CP). According to an embodiment, at least a part (e.g., two or more) of the cellular module 1421, the Wi-Fi module 1423, the BT module 1425, the GNSS module 1427, or the NFC module 1428 may be included within one Integrated Circuit (IC) or an IC package. For example, the RF module 1429 may transmit and receive a communication signal (e.g., an RF signal). For example, the RF module 1429 may include a transceiver, a power amplifier module (PAM), a frequency filter, a low noise amplifier (LNA), an antenna, or the like. According to another embodiment, at least one of the cellular module 1421, the Wi-Fi module 1423, the BT module 1425, the GNSS module 1427, or the NFC module 1428 may transmit and receive an RF signal through a separate RF module. The subscriber identification module 1424 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 1430 (e.g., the memory 1330) may include an internal memory 1432 or an external memory 1434. For example, the internal memory 1432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 1434 may include a flash drive such as compact flash (CF), secure digital (SD), micro secure digital (Micro-SD), mini secure digital (Mini-SD), extreme digital (xD), a multimedia card (MMC), a memory stick, or the like. The external memory 1434 may be operatively and/or physically connected to the electronic device 1401 through various interfaces.

The sensor module 1440 may measure, for example, a physical quantity or may detect an operation state of the electronic device 1401. The sensor module 1440 may convert the measured or detected information to an electric signal. For example, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H (e.g., red, green, blue (RGB) sensor), a biometric sensor 1440I, a temperature/humidity sensor 1440J, an illuminance sensor 1440K, or an UV sensor 1440M. Although not illustrated, additionally or alternatively, the sensor module 1440 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. According to an embodiment, the electronic device 1401 may further include a processor that is a part of the processor 1410 or independent of the processor 1410 and is configured to control the sensor module 1440. The processor may control the sensor module 1440 while the processor 1410 remains at a sleep state.

The input device 1450 may include, for example, a touch panel 1452, a (digital) pen sensor 1454, a key 1456, or an ultrasonic input unit 1458. For example, the touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user. The (digital) pen sensor 1454 may be, for example, a part of a touch panel or may include an additional sheet for recognition. The key 1456 may include, for example, a physical button, an optical key, or a keypad. The ultrasonic input device 1458 may detect (or sense) an ultrasonic signal, which is generated from an input device, through a microphone (e.g., a microphone 1488) and may check data corresponding to the detected ultrasonic signal.

The display 1460 (e.g., the display 1360) may include a panel 1462, a hologram device 1464, a projector 1466, and/or a control circuit for controlling the panel 1462, the hologram device 1464, or the projector 1466. The panel 1462 may be implemented, for example, to be flexible, transparent or wearable. The panel 1462 and the touch panel 1452 may be integrated into a single module. According to an embodiment, the panel 1462 may include a pressure sensor (or force sensor) that measures the intensity of touch pressure by a user. The pressure sensor may be implemented integrally with the touch panel 1452, or may be implemented as at least one sensor separately from the touch panel 1452. The hologram device 1464 may display a stereoscopic image in a space using a light interference phenomenon. The projector 1466 may project light onto a screen so as to display an image. For example, the screen may be arranged in the inside or the outside of the electronic device 1401. The interface 1470 may include, for example, a high-definition multimedia interface (HDMI) 1472, a universal serial bus (USB) 1474, an optical interface 1476, or a D-subminiature (D-sub) 1478. The interface 1470 may be included, for example, in the communication interface 1370 illustrated in FIG. 13. Additionally or alternatively, the interface 1470 may include, for example, a mobile high definition link (MHL) interface, a SD card/multi-media card (MMC) interface, or an infrared data association (IrDA) standard interface.

The audio module 1480 may convert a sound and an electric signal in dual directions. At least a component of the audio module 1480 may be included, for example, in the input/output interface 1350 illustrated in FIG. 13. The audio module 1480 may process, for example, sound information that is input or output through a speaker 1482, a receiver 1484, an earphone 1486, or the microphone 1488. For example, the camera module 1491 may shoot a still image or a video. According to an embodiment, the camera module 1491 may include at least one or more image sensors (e.g., a front sensor or a rear sensor), a lens, an image signal processor (ISP), or a flash (e.g., an LED or a xenon lamp).

The power management module 1495 may manage, for example, power of the electronic device 1401. According to an embodiment, a power management integrated circuit (PMIC), a charger IC, or a battery or fuel gauge may be included in the power management module 1495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, and the like. The motor 1498 may convert an electrical signal into a mechanical vibration and may generate the following effects: vibration, haptic, and the like. The electronic device 1401 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned components of the electronic device according to various embodiments of the disclosure may be configured with one or more components, and the names of the components may be changed according to the type of the electronic device. In various embodiments, some components of the electronic device (e.g., the electronic device 1401) may be omitted or other additional components may be added. Furthermore, some of the components of the electronic device may be combined with each other so as to form one entity, so that the functions of the components may be performed in the same manner as before the combination.

The term "module" used in this disclosure may include a unit composed of hardware, software and firmware and may be interchangeably used with the terms "unit", "logic", "logical block", "part" and "circuit". The "module" may be an integrated part or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 1330) in the form of a program module. The instruction, when executed by a processor (e.g., the processor 1320), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, the one or more instructions may contain a code made by a compiler or a code executable by an interpreter. A module or a program module according to various embodiments may include at least one of the above components, or a part of the above components may be omitted, or other components may be further included. Operations performed by a module, a program module, or other components according to various embodiments may be executed sequentially, in parallel, repeatedly, or in a heuristic method or some operations may be executed in different sequences or may be omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device, comprising:
   one or more antennas;
   a first communication circuitry electrically connected with at least one of the one or more antennas and configured to perform communication according to a first communication protocol which uses a long term evolution (LTE) signal in a licensed band and an LTE signal in an unlicensed band; and
   a second communication circuitry electrically connected with at least one of the one or more antennas and the first communication circuitry and configured to perform communication according to a second communication protocol which uses a Wi-Fi signal in the unlicensed band,
   wherein the first communication circuitry is further configured to:
      obtain information about a state of a channel in the unlicensed band associated with the first communication circuitry and the second communication circuitry from the second communication circuitry;
      determine a time interval to stop processing the LTE signal in the unlicensed band based on the information about the state of the channel;
      identify an end time of a deactivation timer, the deactivation timer being configured to allow at least a part of the first communication circuitry and/or the second communication circuitry to process the LTE signal in the unlicensed band while the deactivation timer is running;
      compare the identified end time to the time interval;
      immediately expire the deactivation timer prior to the end time of the deactivation timer when the end time falls within the time interval based on the comparison;
      deactivate at least a part of the first communication circuitry and/or the second communication circuitry to process the LTE signal in the unlicensed band upon expiration of the deactivation timer;
      calculate a probability that communication will be performed in a next subframe over the channel based on the information about the state of the channel; and
      determine the next subframe as the time interval, when the calculated probability is greater than a first specified value.

2. The electronic device of claim 1, wherein the first communication circuitry is further configured to:
   obtain the information about the state of the channel, when intensity of the Wi-Fi signal received by the second communication circuitry is greater than a specified value.

3. The electronic device of claim 1, wherein the first communication circuitry is further configured to:
   determine a number of subframes to stop processing the LTE signal in the unlicensed band based on the information about the state of the channel.

4. The electronic device of claim 1, wherein the first communication circuitry is further configured to:
   stop decoding the LTE signal in the unlicensed band during the time interval.

5. The electronic device of claim 4, wherein the first communication circuitry is further configured to:
   stop cell-specific reference signal (CRS) blind detection for a subframe of the LTE signal in the unlicensed band received during the time interval.

6. The electronic device of claim 4, wherein the first communication circuitry is further configured to:
   stop decoding a subframe of the LTE signal in the unlicensed band received during the time interval.

7. The electronic device of claim 1, wherein the first communication circuitry is further configured to:
   determine whether to process the LTE signal in the unlicensed band during the time interval based on whether the electronic device supports a partial subframe.

8. The electronic device of claim 1, wherein the first communication circuitry is further configured to:
   calculate the probability that communication will be performed in the next subframe over the channel, based on a time when communication is performed according to the first communication protocol during a specified time interval over the channel and a time when communication is performed according to the second communication protocol; and
   stop decoding the LTE signal in the unlicensed band received in the next subframe, when the calculated probability is greater than a second specified value.

9. The electronic device of claim 1, further comprising:
   a front end module interposed between the one or more antennas and the first communication circuitry,
   wherein the first communication circuitry is further configured to:
      deactivate at least a part of a portion associated with an LTE signal in the unlicensed band of the front end module or a portion associated with an LTE signal in the unlicensed band of the first communication circuitry during the time interval.

10. The electronic device of claim 1, wherein the first communication circuitry is further configured to:
    set an operation mode based on a state of a battery included in the electronic device; and
    determine the time interval associated with processing the LTE signal in the unlicensed band based on the operation mode and the information about the state of the channel.

11. The electronic device of claim 1, wherein the first communication circuitry is further configured to:
    set an operation mode based on selection of a user of the electronic device; and
    determine the time interval associated with processing the LTE signal in the unlicensed band based on the operation mode and the information about the state of the channel.

12. The electronic device of claim 1, wherein the first communication circuitry is further configured to:
    set an operation mode based on a number of Wi-Fi access points detected by the second communication circuitry or a number of devices which accesses the Wi-Fi access points; and
    determine the time interval associated with processing the LTE signal in the unlicensed band based on the operation mode and the information about the state of the channel.

13. The electronic device of claim 1, wherein the first communication circuitry is further configured to:
select at least one of a plurality of subframes assigned to the first communication circuitry based on the information about the state of the channel; and
transmit the LTE signal in the unlicensed band using the at least one of the plurality of subframes.

14. A communication method for an electronic device configured to communicate according to a first communication protocol which uses an LTE signal in a licensed band and an LTE signal in an unlicensed band or a second communication protocol which uses a Wi-Fi signal in the unlicensed band, the method comprising:
obtaining information about a state of a channel in the unlicensed band associated with the first communication protocol and the second communication protocol;
determining a time interval to stop processing the LTE signal in the unlicensed band based on the information about the state of the channel;
identifying an end time of a deactivation timer, the deactivation timer being configured to allow hardware configured to process the LTE signal in the unlicensed band to process the LTE signal in the unlicensed band while the deactivation timer is running;
comparing the identified end time to the time interval;
immediately expiring the deactivation timer prior to the end time of the deactivation timer when the end time falls within the time interval based on the comparison;
deactivating the hardware upon expiration of the deactivation timer;
calculating a probability that communication will be performed in a next subframe over the channel based on the information about the state of the channel; and
determining the next subframe as the time interval, when the calculated probability is greater than a first specified value.

15. The communication method of claim 14, further comprising:
obtaining the information about the state of the channel, when intensity of the Wi-Fi signal is greater than a specified value.

16. The communication method of claim 14, further comprising:
determining a number of subframes to stop processing the LTE signal in the unlicensed band based on the information about the state of the channel.

17. The communication method of claim 14, further comprising
determining whether to process the LTE signal in the unlicensed band during the time interval based on whether the electronic device supports a partial subframe.

18. The communication method of claim 14, further comprising:
calculating the probability that communication will be performed in the next subframe over the channel, based on a time when communication is performed according to the first communication protocol during a specified time interval over the channel and a time when communication is performed according to the second communication protocol; and
stopping decoding the LTE signal in the unlicensed band received in the next subframe, when the calculated probability is greater than a second specified value.

* * * * *